(12) United States Patent
Perttunen

(10) Patent No.: US 7,928,982 B1
(45) Date of Patent: Apr. 19, 2011

(54) VISIBLE REPRESENTATION OF STOCK MARKET INDICES

(76) Inventor: Cary D. Perttunen, Shelby Township, MI (US)

(*) Notice: Subject to any disclaimer, the term of this patent is extended or adjusted under 35 U.S.C. 154(b) by 0 days.

(21) Appl. No.: 12/925,691

(22) Filed: Oct. 27, 2010

Related U.S. Application Data

(63) Continuation of application No. 12/592,176, filed on Nov. 20, 2009, now Pat. No. 7,830,383, which is a continuation of application No. 11/820,859, filed on Jun. 21, 2007, now Pat. No. 7,626,586, which is a continuation of application No. 11/431,801, filed on May 9, 2006, now Pat. No. 7,239,317, which is a continuation of application No. 10/388,258, filed on Mar. 13, 2003, now Pat. No. 7,046,248.

(60) Provisional application No. 60/365,125, filed on Mar. 18, 2002, provisional application No. 60/403,862, filed on Aug. 15, 2002.

(51) Int. Cl.
*G06T 11/20* (2006.01)
(52) U.S. Cl. ........ 345/440; 345/419; 345/441; 345/442; 345/473; 345/619; 705/30; 705/35; 705/36; 705/38; 705/80; 709/217; 709/219; 715/764; 715/834; 715/866
(58) Field of Classification Search .................. 345/419, 345/440, 441, 442, 473, 619; 705/30, 35, 705/36, 37, 39, 80; 709/217, 219; 715/764, 715/834, 866
See application file for complete search history.

(56) References Cited

U.S. PATENT DOCUMENTS

| | | | |
|---|---|---|---|
| 4,717,260 | A | 1/1988 | Tsuji |
| 5,491,779 | A | 2/1996 | Bezjian |
| 5,515,488 | A | 5/1996 | Hoppe et al. |
| 5,550,970 | A | 8/1996 | Cline et al. |
| 5,590,250 | A | 12/1996 | Lamping et al. |
| 5,596,699 | A | 1/1997 | Driskell |
| 5,619,632 | A | 4/1997 | Lamping et al. |
| 5,675,733 | A | 10/1997 | Williams |
| 5,737,557 | A | 4/1998 | Sullivan |
| 5,745,383 | A | 4/1998 | Barber |
| 5,768,423 | A | 6/1998 | Aref et al. |
| 5,798,760 | A | 8/1998 | Vayda et al. |
| 5,805,167 | A | 9/1998 | van Cruyningen |
| 5,926,180 | A | 7/1999 | Shimamura |
| 5,943,039 | A | 8/1999 | Anderson et al. |
| 5,960,443 | A | 9/1999 | Young et al. |
| 5,986,673 | A | 11/1999 | Martz |

(Continued)

OTHER PUBLICATIONS

Notice of Allowability, mailed Dec. 27, 2010, in U.S. Appl. No. 12/924,267, filed Sep. 23, 2010, inventor Cary D. Perttunen, 4 pages.

(Continued)

*Primary Examiner* — Kimbinh T Nguyen

(57) ABSTRACT

Based on a selected stock market index, a visible representation of a plurality of stock market indices is displayed using a display device. The stock market indices comprise the selected stock market index and a plurality of other stock market indices related to the selected stock market index by a non-unary tree. The visible representation comprises a region to represent the selected stock market index. The visible representation further comprises a plurality of regions to represent the plurality of other stock market indices. The plurality of regions are approximately shaped as a plurality of annulus sectors each having a respective area based on a respective market capitalization associated with its represented one of the plurality of other stock market indices. The visible representation represents pairs of stock market indices that are adjacent in the non-unary tree by radially-adjacent pairs of their representing regions.

29 Claims, 11 Drawing Sheets

U.S. PATENT DOCUMENTS

| | | | |
|---|---|---|---|
| 5,987,469 | A | 11/1999 | Lewis et al. |
| 6,014,678 | A | 1/2000 | Inoue et al. |
| 6,057,834 | A | 5/2000 | Pickover |
| 6,057,843 | A | 5/2000 | Van Overveld et al. |
| 6,104,400 | A | 8/2000 | Halachmi et al. |
| 6,144,378 | A | 11/2000 | Lee |
| 6,144,962 | A | 11/2000 | Weinberg et al. |
| 6,145,000 | A | 11/2000 | Stuckman et al. |
| 6,195,103 | B1 | 2/2001 | Stewart |
| 6,239,800 | B1 | 5/2001 | Mayhew et al. |
| 6,285,367 | B1 | 9/2001 | Abrams et al. |
| 6,286,002 | B1 | 9/2001 | Axaopoulos et al. |
| 6,297,824 | B1 | 10/2001 | Hearst et al. |
| 6,314,434 | B1 | 11/2001 | Shigemi et al. |
| 6,337,699 | B1 | 1/2002 | Nielsen |
| 6,343,508 | B1 | 2/2002 | Feller |
| 6,359,635 | B1 | 3/2002 | Perttunen |
| 6,369,819 | B1 | 4/2002 | Pitkow et al. |
| 6,377,287 | B1 | 4/2002 | Hao et al. |
| 6,385,602 | B1 | 5/2002 | Tso et al. |
| 6,426,761 | B1 | 7/2002 | Kanevsky et al. |
| 6,442,544 | B1 | 8/2002 | Kohli |
| 6,448,987 | B1 | 9/2002 | Easty et al. |
| 6,453,303 | B1 | 9/2002 | Li |
| 6,460,033 | B1 | 10/2002 | Perttunen |
| 6,486,898 | B1 | 11/2002 | Martino et al. |
| 6,509,898 | B2 | 1/2003 | Chi et al. |
| 6,549,219 | B2 | 4/2003 | Selker |
| 6,563,521 | B1 | 5/2003 | Perttunen |
| 6,567,108 | B1 | 5/2003 | Master et al. |
| 6,583,794 | B1 | 6/2003 | Wattenberg |
| 6,600,496 | B1 | 7/2003 | Wagner et al. |
| 6,639,614 | B1 | 10/2003 | Kosslyn et al. |
| 6,671,680 | B1 | 12/2003 | Iwamoto et al. |
| 6,801,199 | B1 | 10/2004 | Wallman |
| 6,832,210 | B1 | 12/2004 | Li |
| 7,062,458 | B2 | 6/2006 | Maggioncalda et al. |
| 7,475,046 | B1 | 1/2009 | Foley et al. |
| 7,536,300 | B2 | 5/2009 | Hejna, Jr. |
| 7,685,048 | B1 | 3/2010 | Hausman et al. |
| 7,685,049 | B1 | 3/2010 | Singer |
| 7,774,247 | B2 | 8/2010 | Hausman et al. |
| 2001/0029506 | A1 | 10/2001 | Lee et al. |
| 2001/0045965 | A1 | 11/2001 | Orbanes et al. |
| 2002/0010672 | A1 | 1/2002 | Waelbroeck et al. |
| 2002/0015034 | A1 | 2/2002 | Malmborg |
| 2002/0049687 | A1 | 4/2002 | Helsper et al. |
| 2002/0054166 | A1 | 5/2002 | Decombe |
| 2002/0089541 | A1 | 7/2002 | Orbanes et al. |
| 2002/0089550 | A1 | 7/2002 | Orbanes et al. |
| 2002/0095364 | A1 | 7/2002 | Russell et al. |
| 2002/0109680 | A1 | 8/2002 | Orbanes et al. |
| 2002/0130907 | A1 | 9/2002 | Chi et al. |
| 2002/0140700 | A1 | 10/2002 | Wenzel et al. |
| 2002/0152150 | A1 | 10/2002 | Cooper et al. |
| 2002/0154171 | A1 | 10/2002 | Lee et al. |
| 2002/0154175 | A1 | 10/2002 | Abello et al. |
| 2002/0163517 | A1 | 11/2002 | Loomis et al. |
| 2002/0178096 | A1 | 11/2002 | Marshall |
| 2003/0004845 | A1 | 1/2003 | Takeda et al. |
| 2003/0004995 | A1 | 1/2003 | Novaes |
| 2003/0020762 | A1 | 1/2003 | Budrys et al. |
| 2003/0065608 | A1 | 4/2003 | Cutler |
| 2003/0069826 | A1 | 4/2003 | Guidi et al. |
| 2003/0069834 | A1 | 4/2003 | Cutler |
| 2003/0074142 | A1 | 4/2003 | Steeg |
| 2003/0095156 | A1 | 5/2003 | Klein et al. |
| 2003/0097325 | A1 | 5/2003 | Friesen et al. |
| 2003/0101121 | A1 | 5/2003 | Spampinato et al. |
| 2003/0106057 | A1 | 6/2003 | Perdon |
| 2003/0112280 | A1 | 6/2003 | Driskell |
| 2003/0115023 | A1 | 6/2003 | Nickerson et al. |
| 2003/0117432 | A1 | 6/2003 | Kautto-Kiovula et al. |
| 2003/0126068 | A1 | 7/2003 | Hauk et al. |
| 2003/0126601 | A1 | 7/2003 | Roberts et al. |
| 2003/0137541 | A1 | 7/2003 | Massengale et al. |
| 2003/0144996 | A1 | 7/2003 | Moore, Jr. |
| 2003/0160832 | A1 | 8/2003 | Ridgley et al. |
| 2003/0177077 | A1 | 9/2003 | Norman |
| 2003/0197736 | A1 | 10/2003 | Murphy |
| 2003/0197737 | A1 | 10/2003 | Kim |
| 2003/0197740 | A1 | 10/2003 | Reponen |
| 2003/0210284 | A1 | 11/2003 | Vandruff et al. |
| 2003/0227458 | A1 | 12/2003 | Page |
| 2004/0027349 | A1 | 2/2004 | Landau et al. |
| 2004/0034591 | A1 | 2/2004 | Waelbroeck et al. |
| 2004/0183800 | A1 | 9/2004 | Peterson |
| 2004/0193524 | A1 | 9/2004 | Almeida et al. |
| 2005/0075965 | A1 | 4/2005 | Cutler |
| 2006/0080161 | A1 | 4/2006 | Arnett et al. |
| 2008/0306864 | A1 | 12/2008 | Foley et al. |

OTHER PUBLICATIONS

Notice of Abandonment, mailed Dec. 28, 2010, in U.S. Appl. No. 12/924,267, filed Sep. 23, 2010, inventor Cary D. Perttunen, 2 pages.

U.S. Appl. No. 12/924,267, filed Sep. 23, 2010, inventor Cary D. Perttunen.

VISIBLE REPRESENTATION OF STOCK MARKET INDICES

CROSS REFERENCE TO RELATED APPLICATIONS

This application is a continuation of U.S. application Ser. No. 12/592,176, filed Nov. 20, 2009, now U.S. Pat. No. 7,830,383, which is a continuation of U.S. application Ser. No. 11/820,859, filed Jun. 21, 2007, now U.S. Pat. No. 7,626,586, which is a continuation of U.S. application Ser. No. 11/431,801, filed May 9, 2006, now U.S. Pat. No. 7,239,317, which is a continuation of U.S. application Ser. No. 10/388,258, filed Mar. 13, 2003, now U.S. Pat. No. 7,046,248, which claims the benefit of U.S. Provisional Application No. 60/365,125, filed Mar. 18, 2002, and U.S. Provisional Application No. 60/403,862, filed Aug. 15, 2002. The above-identified applications are hereby incorporated by reference into the present application.

BACKGROUND OF THE INVENTION

1. Field of the Invention

The present invention relates to methods and systems for organizing and displaying financial information.

2. Description of the Related Art

Fidelity Investments' Web site provides a visual representation of stocks in the stock market, which is branded as "Map of the Markets". Each of the stocks is represented by a rectangular shape. An aggregate of the rectangular shapes is also rectangular. Though all of the stocks are represented in a compact form, it is unclear how a stock represented by one rectangle specifically relates to stocks represented by neighboring rectangles.

PCQuote.com introduced a graphical representation of a single equity, branded as "Sniper". The representation has a bulls eye design comprised of 13 sectors, each sector representing an area of reconnaissance. The areas of reconnaissance include: stock flow which indicates a relationship between a number of shares that traded on the bid side versus a number of shares traded on the offer side, quadrant distribution which indicates a total volume of shares traded distributed across four quadrants to show what prices are attracting the most activity, price rotation which numerically indicates when price rotation activity favors buyer or sellers, relative price rotation which visually indicates when price rotation activity favors buyers or sellers, time rotation which measures the acceptance of higher or lower prices, relative time rotation which shows a current time period bias, "to target" which indicates when a stock price is within ½ point of a forecast high or low price, "to exit" which indicates a most extreme stop-out price, buy/sell imbalance which measures where a majority of trades are occurring, look-out signal which indicates a day's direction for an equity, gatekeeper which provides a logical stop-out price, stock and market direction which points out a path of least resistance, and "center of the scope" which indicates whether buyers or sellers are dominant across the board.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE PREFERRED EMBODIMENTS

Figure 1:
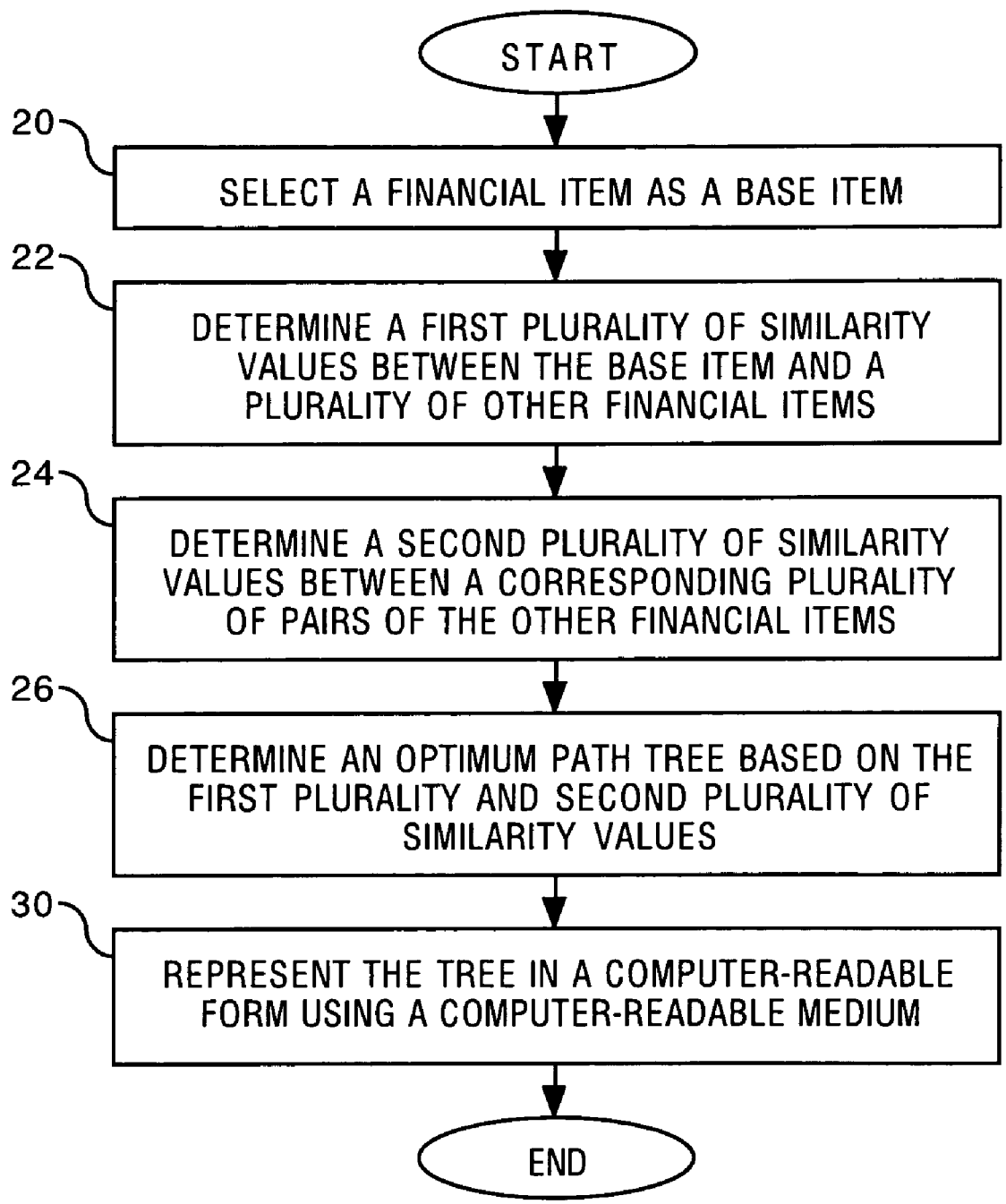
FIG. 1 is a flow chart of an embodiment of a method of relating a plurality of financial items by a tree.

Disclosed herein are improved methods of organizing and representing information pertaining to a plurality of financial items. Examples of the financial items include, but are not limited to, stocks, equities, bonds, commodities, currencies, options, futures, mutual funds, market indices, sector indices, and investment trusts. The financial items are organized into a tree based on a degree of similarity between pairs of the items. The financial items may be further organized by determining a depth-first search of the tree having an optimum value associated therewith. The associated value of a depth-first search is based upon an order of considering financial items in the tree, and similarity values between pairs of financial items in the tree.

Based on the tree and optionally the optimal depth-first search, parameters which define regions to represent the financial items are determined. Each region has a controlled area based upon a predetermined value, herein referred to as a weight, associated with the financial item. Examples of weight values associated with any herein-mentioned financial item include, but are not limited to, a price of the financial item, a trading volume of the financial item, a market capitalization associated with the financial item, a dollar-measured trading volume of the financial item, a book value associated with the financial item, net assets of the financial item, earnings associated with the financial item, and other properties of the financial item.

Preferably, each region has an area monotonically related, and more preferably proportional, to its weight. For example, consider a first region representing a first financial item with a first weight value, and a second region representing a second financial item with a second weight value. If the first weight value is greater than the second weight value, the first region has a first area greater than a second area of the second region.

The weight values need not be determined for cases in which each of the financial items either is unweighted or has the same weight value. In these cases, the hereinafter-described computations can be simplified by assigning a weight of one to each of the financial items. A plurality of regions, each having the same area, results in these cases.

The regions may be visibly displayed to provide a visible representation of the financial information, and/or used to provide an input interface to allow a user-initiated selection of a portion of the financial information. Optionally, the regions may be printed to produce a hard copy representation of the financial information.

Each non-root financial item in the tree is represented by a corresponding concave region such as an annulus sector. In describing shapes in this patent application, the term "annulus sector" is meant to be synonymous with "sector of an annulus". As such, an approximately circular annulus sector is meant to describe an approximate sector of a circular annulus. An approximately circular annulus sector is definable by a first line segment, a second line segment, a first approximately circular arc, and a second approximately circular arc. The first approximately circular arc is at least partially definable by a first focus point and a first radius. The second approximately circular arc is at least partially definable by a second focus point and a second radius. Preferably, the first focus point and the second focus point are located substantially at the same point. It is further preferred that the first radius and the second radius differ so that the region has a radial width.

The first approximately circular arc is further definable by a first starting angle and either a first ending angle or a first arc angle. The second approximately circular arc is further definable by a second starting angle and either a second ending angle or a second arc angle. Preferably, the first arc angle and/or the second arc angle are non-zero so that the region has an angular width. Also preferably, the first starting angle is substantially the same as the second starting angle, the first ending angle is substantially the same as the second ending angle, and the first arc angle is substantially the same as the second arc angle.

The first line segment and the second line segment are preferably oriented substantially radially with respect to a point. Preferably, this point is located substantially at the first focus point and the second focus point. In this case, it is also preferred that the first line segment be oriented substantially radially with respect to the point at an angle substantially the same as the first starting angle and the second starting angle, and that the second line segment be oriented substantially radially with respect to the point at an angle substantially the same as the first ending angle and the second ending angle.

The root financial item may be represented by a substantially convex shape. Preferably, the substantially convex shape is at least partially defined by at least a portion of an approximate circle. Examples of the substantially convex shape having this preferred form include, but are not limited to, an approximate sector of a circle, and approximately an entire circle.

It is noted that use of the terms "approximate" and "approximately" for the herein-disclosed regions, shapes, and curves include non-perfect representations of said regions, shapes, and curves using a display device, a hard copy device such as a printer, and/or an input device. For example, a pixel-based display device can display a plurality of discrete pixels to approximate any of the herein-disclosed regions, shapes, and curves. As another example, a display device may distort an intended region, shape, or curve to produce an approximation thereof. Examples of this distortion include, but are not limited to, a distortion due to pixel aspect ratio, a distortion due to a non-planar display screen, and a distortion due to rasterization.

Approximations of regions, shapes, and curves may also be generated in software or firmware. For example, a curve may be represented by a piecewise approximation. An example of a piecewise approximation of a curve includes, but is not limited to, a piecewise linear approximation. Further examples include a curve being approximated by a simplified equation therefor, and a curve being approximated by a plurality of display points. Examples of ways to approximate a shape or a region include, but are not limited to, using a plurality of points to approximate the shape or region, and using a polygon to approximate the shape or region.

Use of discrete parameter values to represent a region, shape, or curve also may result in an approximation thereof. For example, a circular arc may be represented by an integral center coordinate, an integral radius, an integral start angle, and an integral arc width. In this case, and other cases, either round-off or truncation of parameter values to comply with a discrete representation results in an approximation of a desired region, shape, or curve.

It is noted that a shape need not be precisely convex to be substantially convex. Examples of insubstantial concavities in a substantially convex shape include, but are not limited to, those which may result from an approximation of the shape or a curve which at least partially defines the shape, and those present where endpoints of two curves imprecisely meet.

Before proceeding, a review of graph-related terminology is provided. A graph is definable by a set of nodes and a set of edges joining or associating different pairs of distinct nodes. The edges in the graph may be either directed or undirected. It is noted that alternative terminology may be used to describe the graph. Examples of synonyms of "node" include, but are not limited to, "vertex" and "state". Examples of synonyms of "edge" include, but are not limited to, the terms "arc" and "link". Therefore, the herein-disclosed methods, articles, apparatus, and examples should not be limited by the selected terminology used to describe the graph.

A first node is said to be adjacent to a second node if there is an edge from the first node to the second node. A path is definable by a sequence of nodes wherein each consecutive pair of nodes in the sequence is adjacent.

A tree is a graph having a unique path from a designated node, called a root node, to each of its other nodes. If the tree is undirected, then any of its nodes can be designated to be the root node. An undirected tree can be made into a directed tree by directing all edges away from the designated root node.

Each node in a directed tree, except for the root node, is a child node of a unique parent node from which an edge is directed thereto. Nodes having the same parent node are called siblings. Nodes of a directed tree with no children are called leaf nodes. Nodes having at least one child are called internal nodes.

A level number of a node is defined as the number of edges in the path between the node and the root node. The height of the tree is the largest level number of any node.

If each internal node of a rooted tree has m children, the tree is called an m-ary tree. If $m=1$, the tree is unary. If $m=2$, the tree is binary. If $m=3$, the tree is ternary.

FIG. 1 is a flow chart of an embodiment of a method of relating a plurality of financial items by a tree. Each of the financial items is represented by a corresponding node of the tree. It is preferred that the tree is non-unary. By being non-unary, the tree has at least one internal node with two or more child nodes. It is also preferred that the tree has a height of at least two. It is further preferred that the tree has more leaf nodes than a number of child nodes emanating from its root node.

As indicated by block 20, the method comprises selecting one of the financial items as a base item. The base item is assigned as the root node of the tree. Typically, the base item is one whose relationship with other financial items is of interest. For example, an investor may be interested in how a particular stock relates to other stocks. In this case, the particular stock is selected as the base item.

As indicated by block 22, the method comprises determining a first plurality of similarity values between the base item and a plurality of other financial items. Each of the first plurality of similarity values indicates a degree of similarity or correlation between the base item and a corresponding one of the other financial items.

As indicated by block 24, the method comprises determining a second plurality of similarity values between a corresponding plurality of pairs of the other financial items. Each of the second plurality of similarity values indicates a degree of similarity or correlation between a corresponding pair of the other financial items.

The similarity values may be based on a correlation between trading behaviors of two financial items. For example, the similarity values may be based on either a correlation coefficient between a price behavior of two financial items or a correlation coefficient between a volume behavior of two financial items. A more specific example is the similarity value being based on a correlation coefficient of the end-of-day price data for two stocks over a year. In general, the correlation coefficient may be determined over any time length of data (e.g. a day, a week, a month, a year-to-date, a year or multiple years) with any suitable sampling interval of data (e.g. one minute, 5 minutes, 30 minutes, one day, one week, one month or one year) for any type of data (e.g. price, volume or dollar volume).

As indicated by block 26, the method comprises determining an optimum path tree based on the first plurality of similarity values and the second plurality of similarity values. The optimum path tree indicates a respective optimum path between the base item and each of the other financial items.

The optimum path between the base item and another financial item has an optimum function value of similarity values between the base item and the other financial item. Examples of the function whose optimum value dictates the optimum path include, but are not limited to, a sum of similarity values between the base item and the other financial item, and a product of similarity values between the base item and the other financial item. To determine an optimum product of similarity values, an additive optimum path algorithm may be performed on a logarithm of the similarity values. For example, if the similarity values are numerical values between 0% and 100%, then an additive minimum path algorithm may be performed on a negative logarithm of the non-zero similarity values, e.g. −log(similarity value), to determine a maximum product of similarity values.

Each similarity value may be set to a large constant if a correlation coefficient between its two financial items is less than or equal to zero, and set to the negative logarithm of the correlation coefficient if the correlation coefficient is greater than zero. In this case, an additive minimum path algorithm is performed using the aforementioned similarity values. The large constant is selected so that adjacent pairs of financial items in each minimum path have a correlation coefficient greater than zero.

As is known in the art of network algorithms, examples of algorithms to compute the shortest paths include, but are not limited to, Dijkstra's algorithm and Floyd's algorithm. Those having ordinary skill can review shortest path algorithms on pp. 123-127 of A. Tucker, Applied Combinatorics, Second Edition, John Wiley & Sons, 1984.

As an alternative to block 26, alternative types of spanning trees may be determined based upon the first plurality of similarity values and the second plurality of similarity values. For example, an optimum spanning tree such as a minimum spanning tree may be determined. The optimum spanning tree has an optimum function value of similarity values. Examples of the function whose optimum value dictates the optimum spanning tree include, but are not limited to, a sum of similarity values, and a product of similarity values. To determine an optimum product of similarity values, an additive optimum spanning tree algorithm may be performed on a logarithm of the similarity values.

As is known in the art of network algorithms, examples of algorithms to compute a minimum spanning tree include, but are not limited to, Kruskal's algorithm and Prim's algorithm. Those having ordinary skill can review minimum spanning trees on pp. 127-131 of A. Tucker, Applied Combinatorics, Second Edition, John Wiley & Sons, 1984.

As indicated by block 30, the method comprises representing the tree in a computer-readable form using a computer-readable medium. Various computer-readable data structures can be used to represent the tree in the computer-readable form using the computer-readable medium. Based on the computer-readable form of the tree, regions to represent the financial items can be determined as described with reference to FIGS. 2 to 5.

Figure 2:
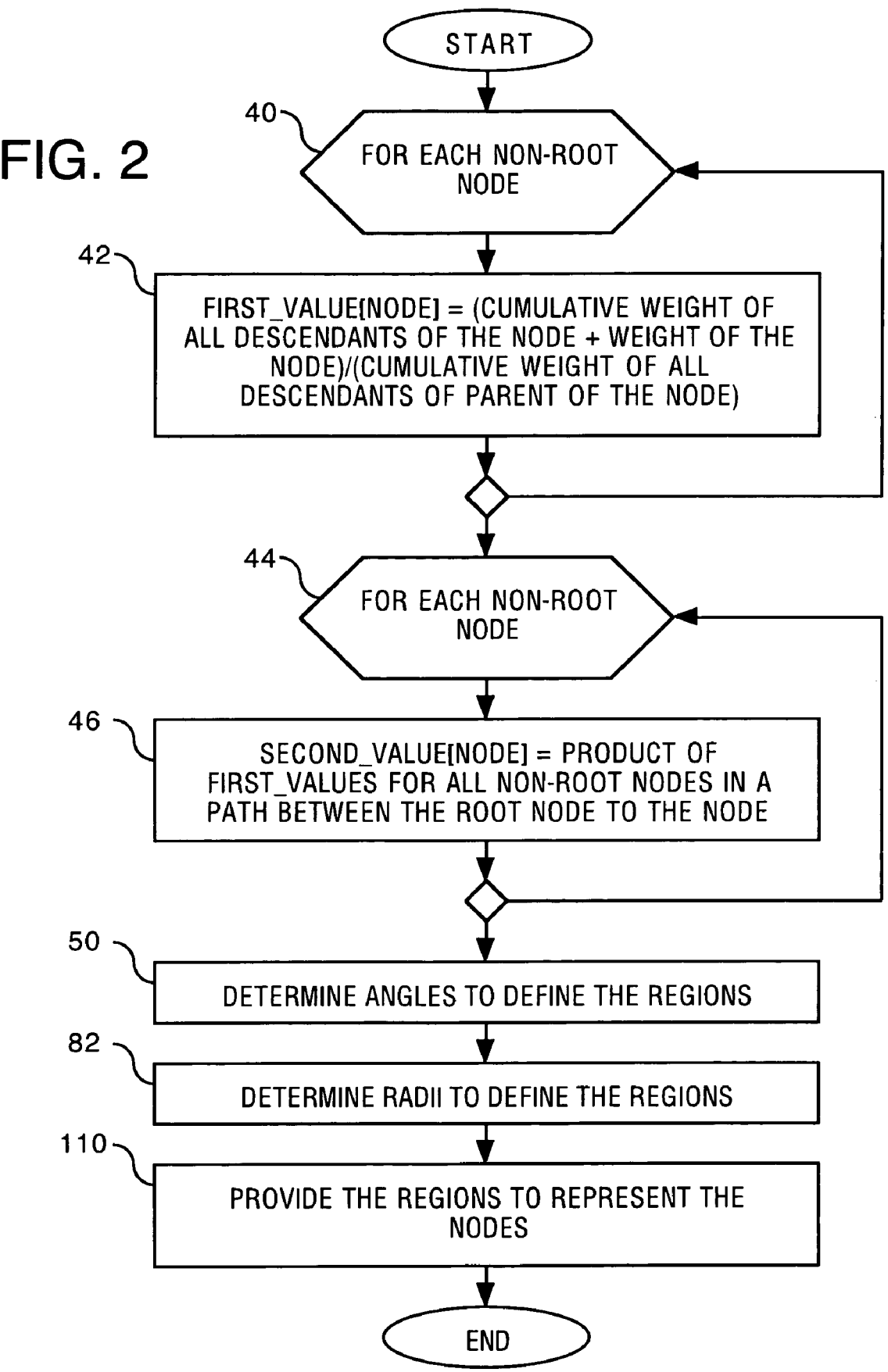
FIG. 2 is a flow chart of an embodiment of a method of determining regions to represent tree-related financial items.

FIG. 2 is a flow chart of an embodiment of a method of determining regions to represent tree-related financial items. Each financial item is represented by a corresponding node of a tree. For each non-root node in the tree (as indicated by block 40), a first value associated with the node is determined (as indicated by block 42). The first value is based on (W+C1)/C2, wherein W denotes a weight of the node, C1 denotes a cumulative weight of all descendants of the node, and C2 denotes a cumulative weight of all descendants of a parent of the node.

For each non-root node in the tree (as indicated by block 44), a second value associated with the node is determined (as indicated by block 46). The second value is equal to a product of the first values for all non-root nodes in a tree-defined path from the root node to the node.

As indicated by block 50, the method comprises determining angles to define the regions based on the second values. The angles may be based on an overall angular width of an aggregation of the regions, herein denoted by MAXIMUM_ARC_ANGLE, and an initial starting angle of the aggregation of the regions, herein denoted by FIRST_START_ANGLE. In general, the MAXIMUM_ARC_ANGLE value can be any value, such as less than 180 degrees, about equal to 180 degrees, greater than 180 degrees but less than 360 degrees, or about equal to 360 degrees. If the MAXIMUM_ARC_ANGLE is equal to 360 degrees, the region representing the root node is a circle. If the MAXIMUM_ARC_ANGLE is less than 360 degrees, the region representing the root node is a sector of a circle having a start angle and an end angle.

The start angle for the root node is set to the FIRST_START_ANGLE value. The end angle for the root node is set to a sum of the FIRST_START_ANGLE value and the MAXIMUM_ARC_ANGLE value. A resulting arc angle for the root node is equal to the MAXIMUM_ARC_ANGLE value.

Figure 3:
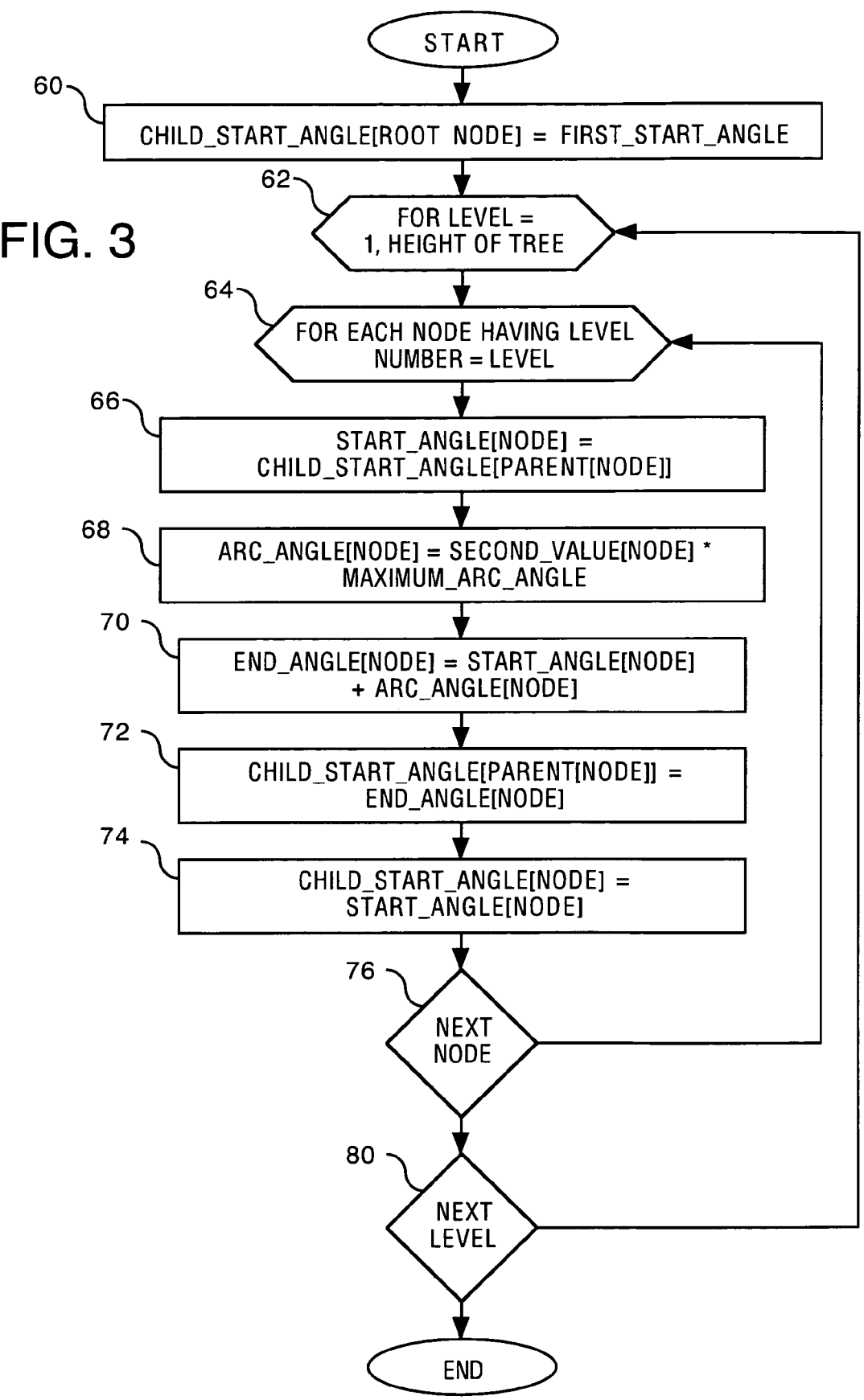
FIG. 3 is a flow chart of an embodiment of a method of determining angles to define the regions.

An embodiment of a method of determining angles associated with non-root nodes is shown in FIG. 3. As indicated by block 60, the method comprises initializing a variable, herein denoted by CHILD_START_ANGLE, of the root node. The CHILD_START_ANGLE of the root node is initialized to be equal to FIRST_START_ANGLE. As indicated by block 62, a variable denoted as LEVEL is prepared to increment from 1 to a height of the tree. As indicated by block 64, the method comprises performing acts for each node having a level number equal to the LEVEL variable. The acts comprise determining a start angle for the node (block 66), an arc angle for the node (block 68), and an end angle for the node (block 70).

The start angle is equal to the CHILD_START_ANGLE value of the parent of the node. The arc angle is equal to a product of the second value of the node and the MAXIMUM_ARC_ANGLE value. The end angle is equal to a sum of the start angle and the arc angle. Alternatively, the end angle may be equal to the start angle minus the arc angle.

The acts further comprise updating the CHILD_START_ANGLE of the parent of the node (block 72), and setting the CHILD_START_ANGLE of the node (block 74). The CHILD_START_ANGLE of the parent of the node is updated to be equal to the end angle for the node. The CHILD_START_ANGLE of the node is set to the start angle for the node. Optionally, the act in block 74 is omitted if the node is a leaf node.

As indicated by block 76, flow of the method is directed back to block 64 if there is a further node having a level number equal to the LEVEL variable. Otherwise, flow of the method is directed to block 80. From block 80, if there is a further level to process, flow of the method is directed to block 62 wherein the LEVEL variable is incremented. If there are no further levels to process, the method is completed.

Referring back to FIG. 2, an act of determining radii to define the regions is performed as indicated by block 82. Preferably, the region representing the root node is definable by a single radius. Thus, if the MAXIMUM_ARC_ANGLE is equal to 360 degrees, the region representing the root node may be a circle; and if the MAXIMUM_ARC_ANGLE is less than 360 degrees, the region representing the root node may be a sector of a circle.

Figure 4:
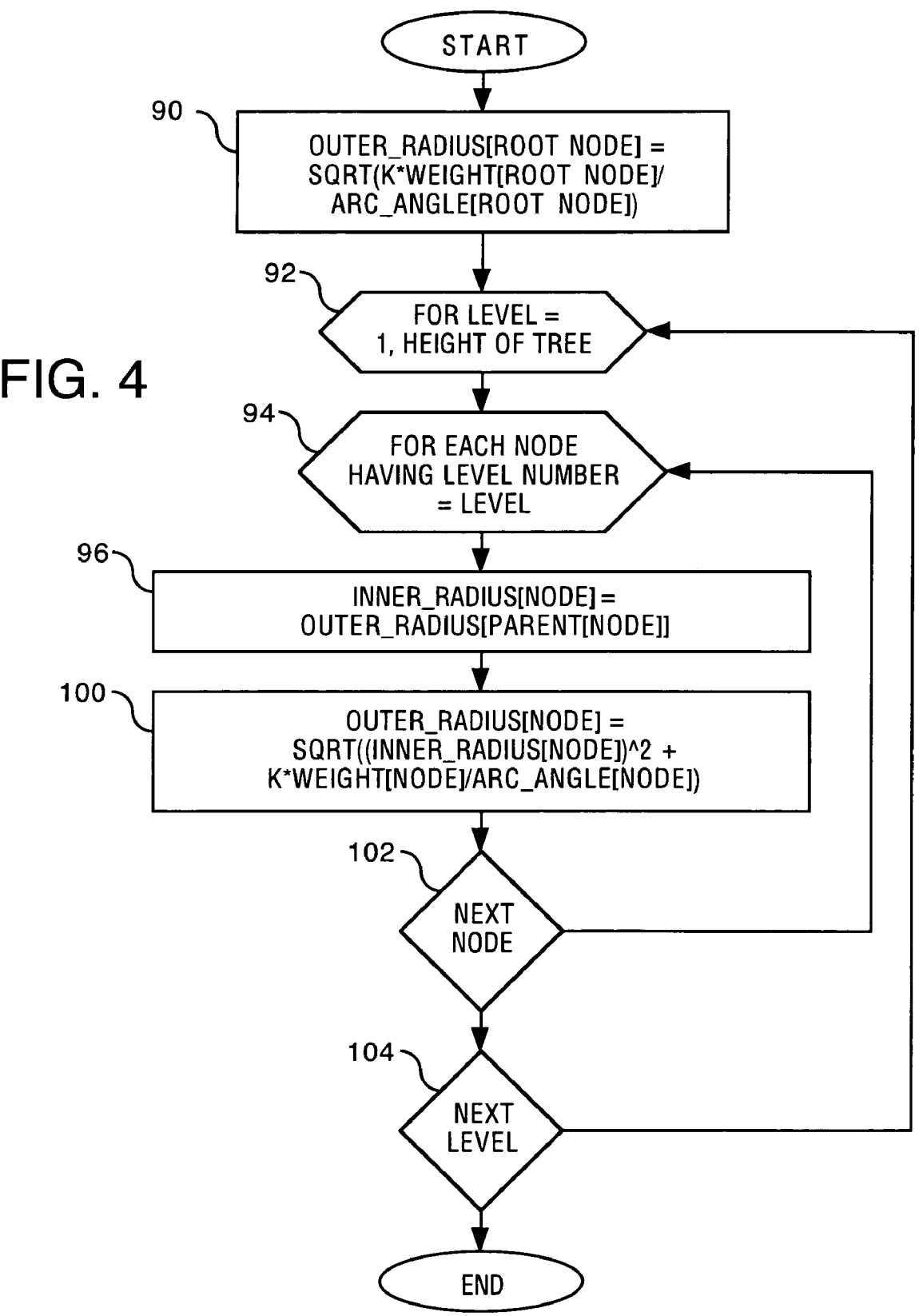
FIG. 4 is a flow chart of an embodiment of a method of determining radii to define the regions.

FIG. 4 is a flow chart of an embodiment of a method of determining radii to define the regions. The radii may be based on an overall radius of the aggregate of the regions, herein denoted by MAXIMUM_RADIUS. To simplify subsequent computations, a constant K defined as the MAXIMUM_ARC_ANGLE times the square of the MAXIMUM_RADIUS, divided by the cumulative weight of all nodes in the tree, is determined.

$$K=\text{MAXIMUM\_ARC\_ANGLE}*(\text{MAXIMUM\_RADIUS})^2/(\text{cumulative weight of all nodes in the tree})$$

As indicated by block 90, an outer radius for the root node is determined. The outer radius for the root node is equal to the square root of: K times the weight of the root node divided by the arc angle for the root node.

As indicated by block 92, a variable denoted as LEVEL is prepared to increment from 1 to a height of the tree. As indicated by block 94, the method comprises performing acts for each node having a level number equal to the LEVEL variable. The acts comprise determining an inner radius for the node (block 96) and an outer radius for the node (block 100). The inner radius for the node is determined to be equal to the outer radius for the parent of the node. The outer radius for the node is equal to the square root of: the sum of square of the inner radius of the node and K times the weight of the node divided by the arc angle for the node. Optionally, if the node is a leaf node, the outer radius of the node can be determined to be equal to the MAXIMUM_RADIUS value without performing the aforementioned computation.

As indicated by block 102, flow of the method is directed back to block 94 if there is a further node having a level number equal to the LEVEL variable. Otherwise, flow of the method is directed to block 104. From block 104, if there is a further level to process, flow of the method is directed to block 92 wherein the LEVEL variable is incremented. If there are no further levels to process, the method is completed.

Referring back to FIG. 2, an act of providing the regions to represent the nodes in the tree is performed, as indicated by block 110. Each non-root node is represented by a corresponding region definable with respect to a common focus point by the start angle, end angle, inner radius, and outer radius. The root node is represented by a region definable with respect to the common focus point by an outer radius, and optionally a start angle and an end angle.

The resulting aggregation of regions has many desirable qualities. For any tree configuration, the herein-disclosed method provides a one-to-one correspondence between the financial items and the regions. By one-to-one correspondence, it is meant that each financial item is represented by one and only one of the regions, and each of the regions represents one and only one of the financial items.

Further, the aggregation of regions is contiguous for any tree configuration, which in the context of this disclosure is broadly inclusive of describing the regions as being either neighboring or adjacent throughout the aggregation. For example, adjacent pairs of regions which are spaced slightly apart are considered to be contiguous.

Still further, the aggregation of regions defines an identifiable boundary at its periphery for any tree configuration. If the MAXIMUM_ARC_ANGLE value is 360 degrees, the boundary comprises a circle having a radius equal to the MAXIMUM_RADIUS value. If the MAXIMUM_ARC_ANGLE value is less than 360 degrees, the boundary comprises an arc having a radius equal to the MAXIMUM_RADIUS value, a start angle equal to the FIRST_START_ANGLE value, and an arc angle equal to the MAXIMUM_ARC_ANGLE value.

Yet still further, for any tree configuration, the herein-disclosed method provides a one-to-one correspondence between leaf nodes and regions adjacent the circle or arc boundary. By one-to-one correspondence, it is meant that all the leaf nodes are represented by regions adjacent the circle or arc boundary, and all regions adjacent the circle or arc boundary represent leaf nodes. Thus, a user can easily identify the leaf nodes of the tree even if the branches of the tree have different lengths.

Also, for any tree configuration, the area of each region is proportional to the weight of its corresponding financial item. If the nodes are either equally weighted or unweighted, each of the regions has the same area for any tree configuration.

It is noted that there are various scenarios in which regions having areas strictly unproportional to their weights have areas substantially proportional to their weights. Examples of sources of deviation in areas which still provide substantially proportional areas, but are not limited to, approximations used to display the regions (see the discussion herein of "approximate" and "approximately"), approximations in the mathematical processes used to calculate the areas and/or the parameters which define the regions, and round-off and/or truncation errors in the mathematical processes used to calculate the areas and/or the parameters which define the regions.

It is noted that any values or parameters which are herein-described as being the same or equal can be slightly different, i.e. either about or approximately the same, either about or approximately equal. In a particular example, the inner radius of one or more nodes (determined in block 96 in FIG. 4) can be modified to be slightly greater than the outer radius of its parent to mitigate a possibility of radially-overlapping regions. Another way to mitigate radially-overlapping regions comprises modifying the outer radius of one or more nodes to be slightly less than the inner radius of each of its children. In either of the above two examples, the inner radius and the outer radius are still considered to be about equal. Similarly, the start angle and/or end angle of each region can be compressed toward the center of its region to mitigate a possibility of angularly-overlapping regions. In this case, angles of angularly adjacent regions are still considered to be about equal. In any of the above examples, the resulting area of the region is still considered to be about monotonically-related and/or about proportional to the weight of its corresponding node.

Figure 5:
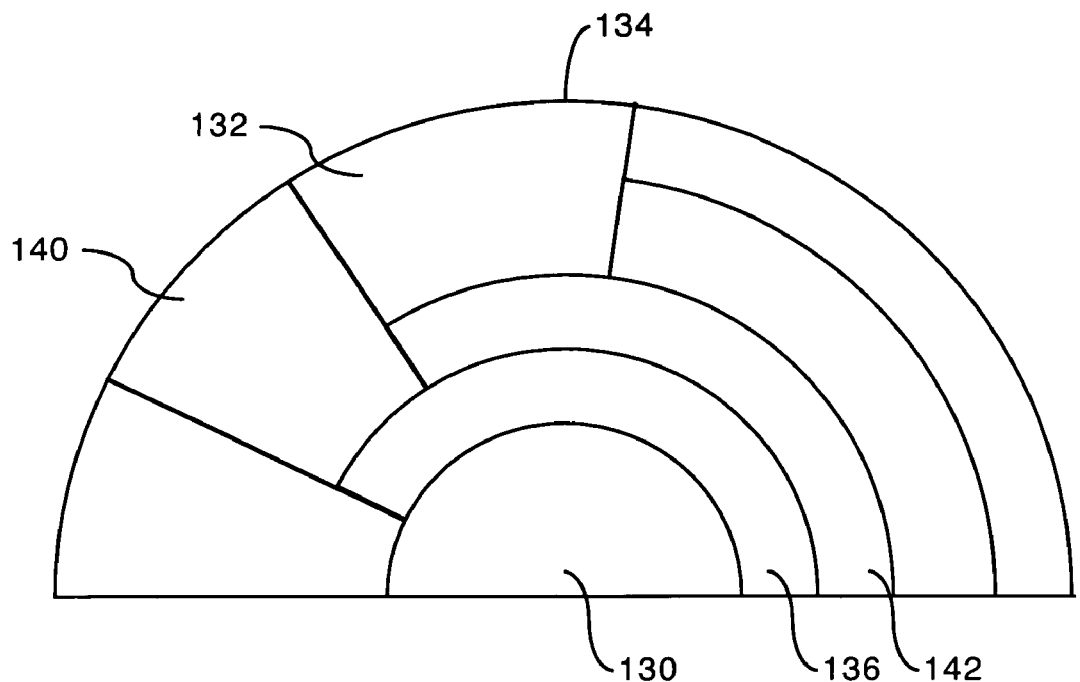
FIG. 5 shows an example of regions which represent tree-related financial items.

An example of regions which represent equally-weighted tree-related financial items is shown in FIG. 5. A semicircular region 130 represents a base financial item (i.e. a root node of a tree). Circular annulus sectors, a representative one indicated by reference numeral 132, represent other financial items whose relationship with the base financial item is of interest (i.e. non-root nodes of the tree).

All of the leaf nodes are represented by regions adjacent a semicircular arc 134 which partially defines a periphery of the aggregation of the regions. The regions are approximated by rounding the start angle and the end angle to an integral number of degrees, and rounding the outer radius to an integral number of display units. All of the regions have approximately the same area.

The circular annulus sectors comprise a first circular annulus sector region 136 to represent a first financial item, a second circular annulus sector region 140 to represent a second financial item and a third circular annulus sector region 142 to represent a third financial item. The second and third circular annulus sector regions 140 and 142 are radially adjacent the first circular annulus sector region 136. The second circular annulus sector region 140 is angularly adjacent the third circular annulus sector region 142. A radial width of the second circular annulus sector region 140 differs from a radial width of the third annulus sector region 142.

The relationship of the first, second and third financial items to the base financial item is intuitively represented by the juxtaposition of their associated regions. By virtue of the first region 136 being radially interposed between the region 130 and the regions 140 and 142, the base financial item is more similar to the first financial item than to the second and third financial items.

The act of providing the regions may comprise outputting a signal to display the regions and/or outputting a signal to make the regions user-selectable, to provide a user interface. The at least one signal to provide the user interface may be communicated by a computer data signal. The computer data signal may be communicated via a computer network. Examples of the computer network include, but are not limited to, an intranet, an internet and an extranet. The computer data signal may include computer program code to assist in providing the user interface. Of particular interest are signals representative of code in a markup language such as HTML (hypertext markup language).

The user-selectable regions can be provided in a variety of ways. Of particular interest is use of either a client-side image map or a server-side image map to provide the user-selectable regions in relation to an image of the regions. Here, a user-selectable region can be provided using HTML tags to approximate any of the herein-disclosed shapes, including convex shapes such as sectors and concave shapes such as annular sectors. In particular, the polygon area definition in an AREA tag inside a MAP tag can be used to provide a user-selectable region having one of the herein-disclosed shapes.

It is noted that a markup language improvement is contemplated which would provide an annular sector area definition and a sector area definition in an AREA tag inside a MAP tag.

For example, a sector of a circle could be definable by an AREA tag having the following form:
<AREA SHAPE="circle_sector"
    COORDS="x,y,x1,y1,x2,y2,x3,y3"
    HREF="URL">
where (x,y) are coordinates of a center point of an arc-defining circle, (x1,y1) are coordinates of a point either on or collinear with a first radial line segment, (x2,y2) are coordinates of a point either on or collinear with a second radial line segment, (x3,y3) are coordinates of a point either on or co-circular with the circular arc, and URL is a computer address such as a uniform resource locator which is linked to in response to a user selection of the region. It is noted that the HREF="URL" portion can replaced by one or more event codes (e.g. onclick, ondblclick, onmousedown, onmousemove, onmouseover, onmouseout, onmouseup) each followed by an associated function.

A sector of a circular annulus could be definable by an AREA tag having the following form:
<AREA SHAPE="annulus_sector"
    COORDS="x,y,x1,y1,x2,y2,x3,y3,x4,y4"
    HREF="URL">
where (x,y) are coordinates of a center point of a first arc-defining circle and a second arc-defining circle, (x1,y1) are coordinates of a point either on or collinear with a first radial line segment, (x2,y2) are coordinates of a point either on or collinear with a second radial line segment, (x3,y3) are coordinates of a point either on or co-circular with the first circular arc, (x4,y4) are coordinates of a point either on or co-circular with the second circular arc, and URL is a computer address such as a uniform resource locator which is linked to in response to a user selection of the region. It is noted that the HREF="URL" portion can replaced by one or more event codes (e.g. onclick, ondblclick, onmousedown, onmousemove, onmouseover, onmouseout, onmouseup) each followed by an associated function.

With this improvement, a user interface creator can more directly implement user-selectable regions having some of the herein-disclosed shapes.

The at least one signal is communicated by a waveform representative thereof through a communication medium. Examples of the waveform and the communication medium include, but are not limited to, an optical waveform through an optical medium, an electronic waveform through an electronic medium, and an electromagnetic waveform through an electromagnetic medium.

Based on the at least one signal, the regions may be displayed by a display device. Examples of the display device include, but are not limited to, a computer monitor, a television, a liquid crystal display, a cathode ray tube, and a gas plasma display. For a computer data signal, the at least one signal is received by a computer in communication with the computer network. The computer generates a display signal to display the region on the display device.

Figure 6:
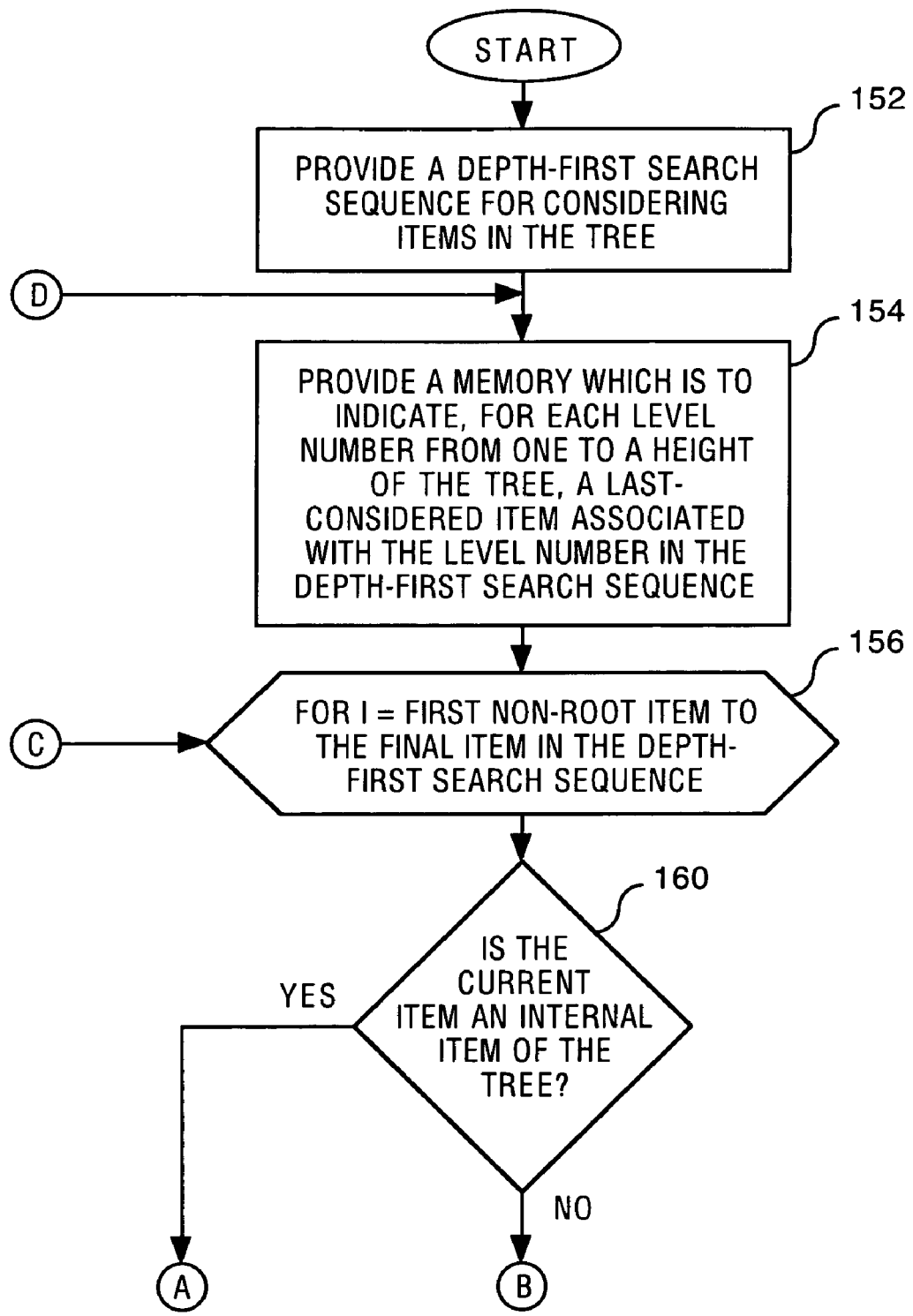
FIGS. 6, 7(A-B) and 8 are a flow chart of an embodiment of a method of further organizing the financial item information.
Figure 7A:
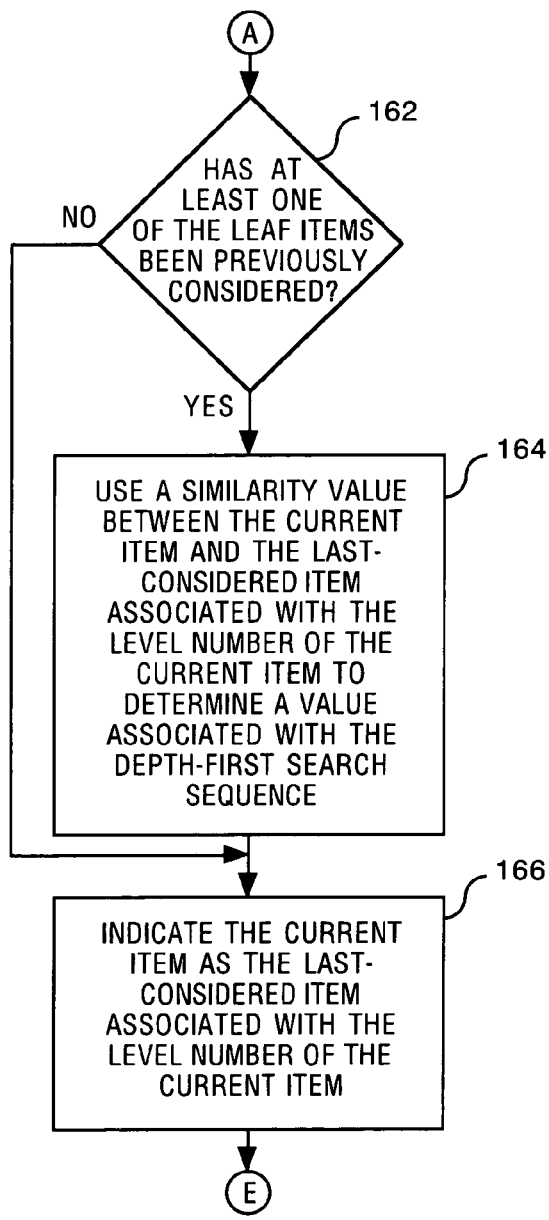
Figure 7B:
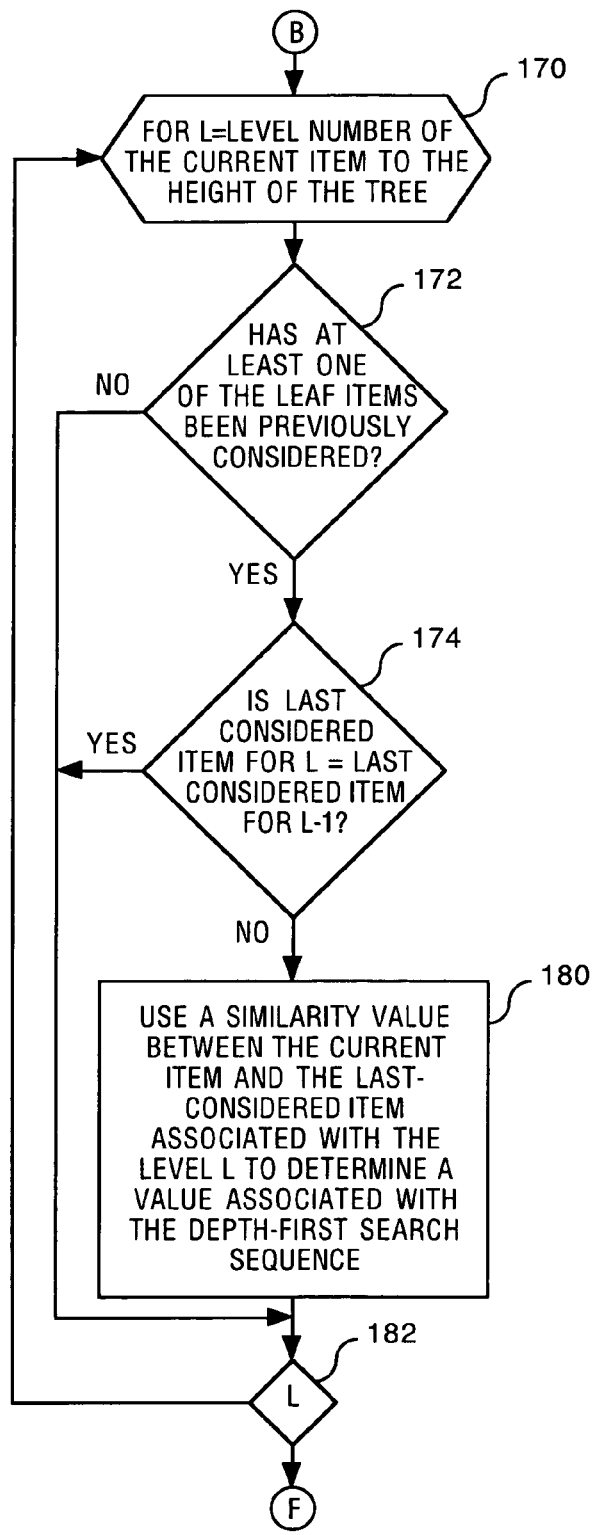

Optionally, the regions representing the financial items may be arranged to optimize or otherwise improve a function of similarity values between pairs of financial items represented by angularly-adjacent regions, while maintaining the radial-adjacency between adjacent financial items in the tree. FIGS. 6, 7(A-B) and 8 provide a flow chart of an embodiment of a method of further organizing the financial item information.

As indicated by block 152, the method comprises providing a depth-first search sequence for considering financial items in the tree. An initial depth-first search sequence may be provided by initializing, for each of the internal items having at least two child items in the tree, a respective sequence for considering its respective child items.

As indicated by block 154, the method comprises providing a memory which is to indicate, for each level number from one to a height of the tree, a last-considered item associated with the level number in the depth-first search sequence. The memory may be initialized to indicate that no items have been considered at each level number from one to the height of the tree.

As indicated by block 156, the method comprises considering a first non-root item in the depth-first search sequence as a current item. As indicated by block 160, the method comprises determining if the current item is an internal item of the tree. If the current item is an internal item of the tree, an act of determining if at least one of the leaf items had been previously considered in the depth-first search sequence is performed (block 162).

If at least one of the leaf items had been previously considered in the depth-first search sequence, a similarity value between the current item and the last-considered item associated with the level number of the current item is used to determine a value associated with the depth-first search sequence (block 164). As indicated by block 166, the current item is indicated as the last-considered item associated with the level number of the current item.

Referring back to block 160, if the current item is not an internal item of the tree, and thus is a leaf item of the tree, a subprocess is performed for each level number L from the level number of the current item to the height of the tree (block 170). The subprocess comprises determining if at least one of the leaf items had been previously considered in the depth-first search sequence (block 172) and determining if the last-considered item associated with level number L is the same as the last-considered item associated with level number L−1 (block 174). Since the root item is always the last-considered item associated with level number 0, the last-considered item associated with level number 1 always differs from the last-considered item associated with level number 0. Thus, block 174 may be skipped for L=1.

If at least one of the leaf items has been previously considered in the depth-first search sequence and the last-considered item associated with level number L differs from the last-considered item associated with level number L−1, a similarity value between the current item and the last-considered item associated with the level number L is used to determine a value associated with the depth-first search sequence (block 180). As indicated by block 182, the subprocess is performed one or more times for each level number indicated in block 170.

Each of the similarity values described with reference to blocks 164 and 180 indicates a degree of similarity or correlation between a corresponding pair of financial items. The similarity values described with reference to blocks 164 and 180 may be the same as the second plurality of similarity values used to determine the tree. Alternatively, the similarity values described with reference to blocks 164 and 180 may differ from the second plurality of similarity values used to determine the tree.

As indicated by block 186, a subprocess is performed for each level number L from the level number of the current item to the height of the tree. As indicated by block 190, the current item is indicated as the last-considered item associated with the level number L. As indicated by block 192, the subprocess is performed one or more times for each level number indicated in block 186.

As indicated by block 194, a subsequent item in the depth-first search sequence is considered as the current item. Flow of the method may be directed back to block 156 until no subsequent items exist in the depth-first search sequence. Optionally, block 156 may be modified to further iterate, after the final item, from the first non-root item to the first leaf item. In this case, items from the first non-root item to the first leaf item are considered twice.

The value associated with the depth-first search sequence is a function of the similarity values identified in blocks 164 and 180. For example, the function may be based on a sum of the aforementioned similarity values, a product of the aforementioned similarity values, an average of the aforementioned similarity values such as either an arithmetic mean or a geometric mean of the aforementioned similarity values, a maximum of the aforementioned similarity values, or a minimum of the aforementioned similarity values.

The function may be partially evaluated each time a similarity value is identified in blocks 164 and 180. Alternatively, the function may be evaluated after all of the similarity values have been identified in blocks 164 and 180 for all iterations of block 156. In general, the similarity values identified in blocks 164 and 180 may be used at any time to evaluate the function and thus determine the value associated with the depth-first search sequence.

As indicated by block 196, the depth-first search sequence is modified. The depth-first search sequence may be modified by modifying the sequence for considering child items for each of at least one of the internal items having at least two child items in the tree. Flow of the method is directed back to block 154 to initiate the process of determining a value associated with the modified depth-first search sequence. The memory provided for indicating last-considered items in the initial depth-first search sequence may be either different or the same as the memory provided for indicating last-considered items for the modified depth-first search sequence.

In this way, values associated with a plurality of depth-first search sequences of the tree are determined. Optionally, values associated with all possible depth-first search sequences of the tree may be determined. The number of possible depth-first search sequences of the tree is equal to the product of the factorial of each internal node's number of children nodes.

Using an embodiment of the herein-disclosed method for some functions, two depth-first search sequences have the same value associated therewith if one has an order of considering leaf items which is the reverse of the other. Thus, in these and other cases, values associated with at most half of all possible depth-first search sequences of the tree may be determined. The depth-first search sequences which are considered may be limited by prohibiting reverse-equivalent sequences for considering child items of the root item. A branch-and-bound approach, for example, may be used to limit consideration to less than half of all possible depth-first search sequences.

Using another embodiment of the herein-disclosed method for some functions, two depth-first search sequences have the same value associated therewith if one has an order of considering leaf items which is either a cyclic-equivalent or a reverse cyclic-equivalent of the other. For example, a sequence A-B-C-D has three cyclic-equivalent sequences B-C-D-A, C-D-A-B and D-A-B-C, and four reverse cyclic-equivalent sequences D-C-B-A, A-D-C-B, B-A-D-C and C-B-A-D. Thus, in these and other cases, values associated with at most $M/(2*N)$ sequences may be determined, where M is the number of all possible depth-first search sequences of the tree, and N is the number of child items of the root item. The depth-first search sequences which are considered may be limited by prohibiting cyclic-equivalent and reverse cyclic-equivalent sequences for considering child items of the root item. A branch-and-bound approach, for example, may be used to limit consideration to less than $M/(2*N)$ sequences.

As indicated by block 200, the method comprises determining which evaluated depth-first search sequence has an optimum value associated therewith. Depending on the function used to determine values associated with depth-first search sequences, this act may comprise either determining which depth-first search sequence has a maximum associated value, or determining which depth-first search sequence has a minimum associated value.

Figure 9:
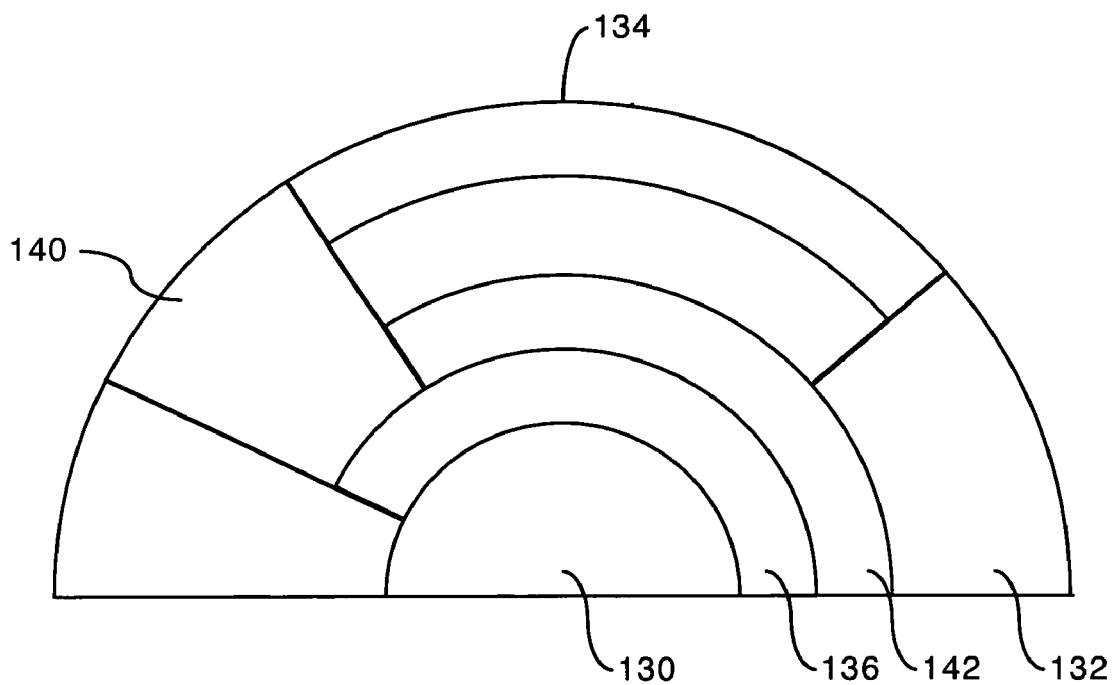
FIG. 9 shows an example of a rearrangement of the regions in FIG. 5.
Figure 8:
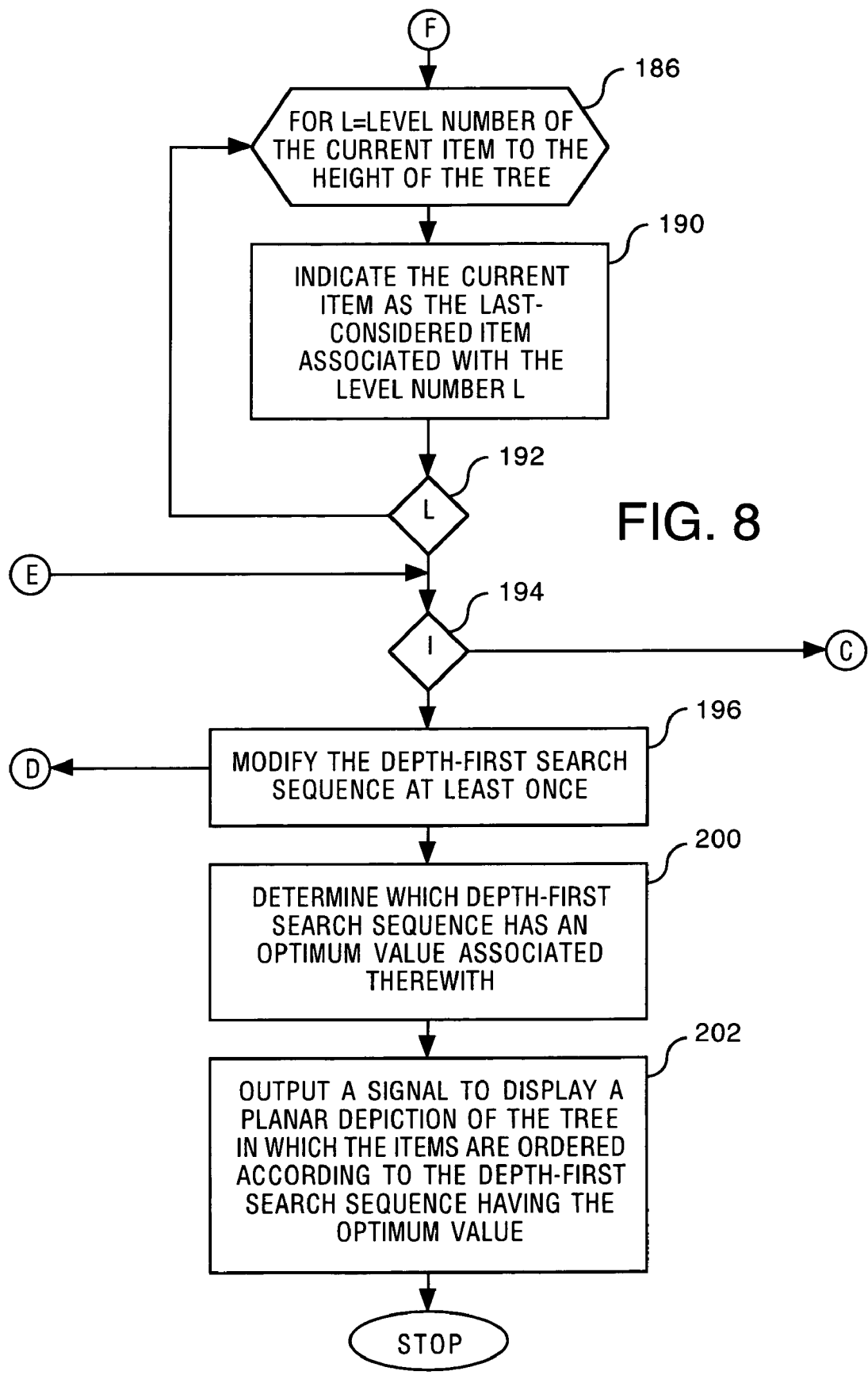

As indicated by block 202, a planar depiction of the tree is provided in which the items are ordered according to the depth-first search sequence having the optimum value. The planar depiction may comprise a plurality of regions to visibly represent the items, wherein adjacent items in the tree are represented by radially-adjacent regions, and wherein pairs of items identified in blocks 164 and 180 for the depth-first search sequence having the optimum value are represented by angularly-adjacent regions. In this case, if the acts in FIGS. 2-4 had been performed to determine parameters defining the regions for a non-optimal arrangement, only the angles defining the regions need to be determined for the optimal arrangement. Thus, the acts in FIG. 3 are performed again, where the order of the nodes considered in block 64 is dictated by the order of the nodes in the optimum depth-first search sequence. The optimal arrangement does not affect the inner radius and outer radius of each region. For example, the regions in FIG. 5 may be rearranged as shown in FIG. 9 after performing the method described with reference to FIGS. 6-8 and recalculating the angles as described with reference to FIG. 3. Alternatively, the acts in FIGS. 2-4 can be performed to determine all of the parameters for all of the regions.

If the depiction is to span an overall angular width of about 360 degrees, it is preferred that block 156 be modified to further iterate, after the final item, from the first non-root item to the first leaf item.

Alternatively, the planar depiction may comprise a plurality of regions to visibly represent the items, wherein adjacent items in the tree are represented by a visible edge between their corresponding regions, and wherein child items are ordered (either left-to-right, right-to-left, top-to-bottom, bottom-to-top, clockwise or counterclockwise, for example) according to the sequence associated with the depth-first search sequence having the optimum value.

An example is given to illustrate one embodiment of a method of organizing financial information. As should be appreciated, the scope of the present disclosure is not to be limited by this example.

Figure 10:
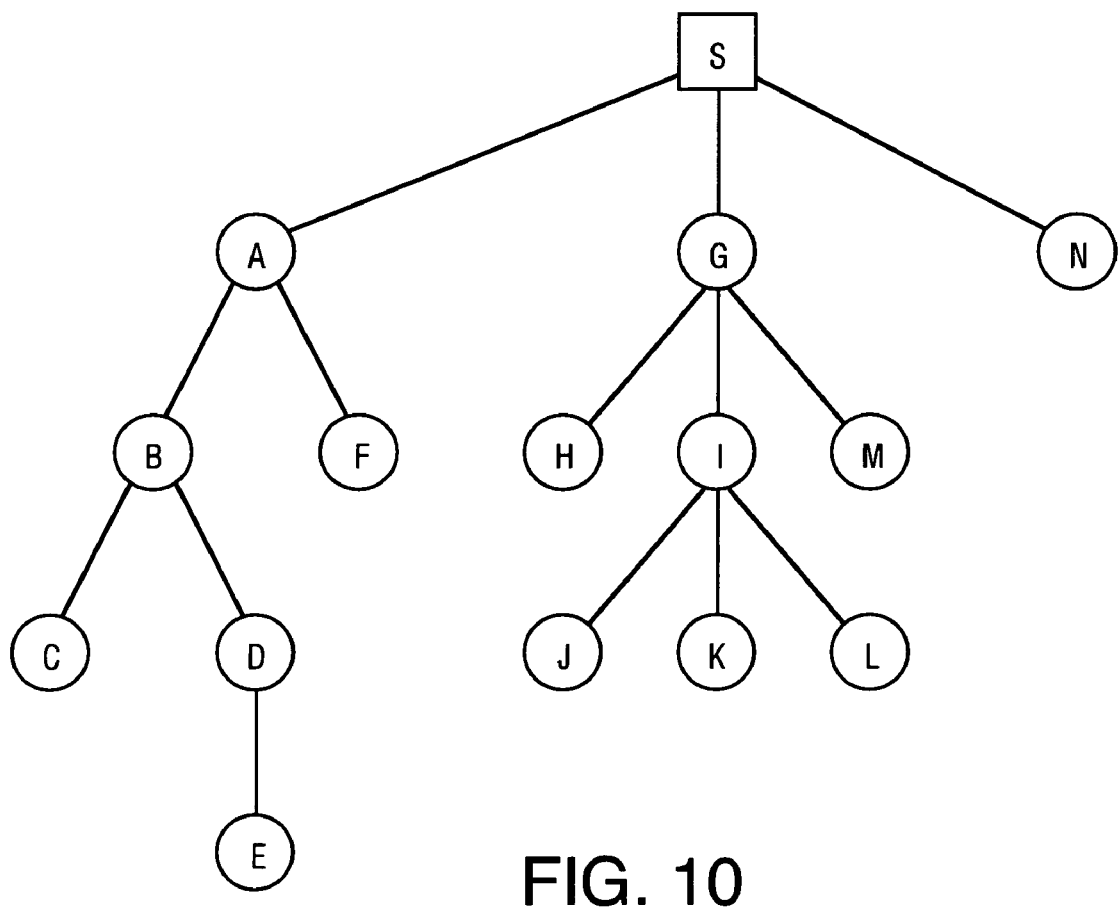
FIG. 10 is an example of a tree which relates fourteen stocks A-N to a base stock S.

For purposes of illustration and example, consider a tree shown in FIG. 10 which relates fourteen stocks A-N to a base stock S. The tree may be determined as described with reference to FIG. 1 based on a correlation of price behavior of the stocks. For each of the stocks, TABLE I shows an initial sequence for considering its child stocks in a depth-first search of the tree. The initial sequence is used to provide an initial depth-first search sequence for considering stocks in the tree.

TABLE I

| Stock | Sequence for considering child stocks |
|---|---|
| S | A G N |
| A | B F |

TABLE I-continued

| Stock | Sequence for considering child stocks |
|---|---|
| B | C D |
| C | — |
| D | E |
| E | — |
| F | — |
| G | H I M |
| H | — |
| I | J K L |
| J | — |
| K | — |
| L | — |
| M | — |
| N | — |

TABLE II illustrates one embodiment of determining a value associated with the initial depth-first search sequence. Each row in TABLE II represents an iteration associated with one of the stocks. From left to right, the columns in TABLE II indicate: (a) if at least one leaf stock had been previously considered, (b) the current stock being considered in the depth-first search sequence of the tree, (c) whether the current stock is an internal stock or a leaf stock of the tree, (d) the level number of the current stock, (e) a last-considered stock associated with level number 1, (f) a last-considered stock associated with level number 2, (g) a last-considered stock associated with level number 3, (h) a last-considered stock associated with level number 4, and (i) which similarity values are used to determine the value.

TABLE II

| At least one leaf stock previously considered? | Stock | Internal or leaf? | Level | 1 | 2 | 3 | 4 | Similarity values used in function evaluation |
|---|---|---|---|---|---|---|---|---|
| No | A | Internal | 1 | A | — | — | — | — |
| No | B | Internal | 2 | A | B | — | — | — |
| No | C | Leaf | 3 | A | B | C | C | — |
| Yes | D | Internal | 3 | A | B | D | C | (C, D) |
| Yes | E | Leaf | 4 | A | B | D | E | (C, E) |
| Yes | F | Leaf | 2 | A | F | F | F | (B, F) (D, F) (E, F) |
| Yes | G | Internal | 1 | G | F | F | F | (A, G) |
| Yes | H | Leaf | 2 | G | H | H | H | (F, H) |
| Yes | I | Internal | 2 | G | I | H | H | (H, I) |
| Yes | J | Leaf | 3 | G | I | J | J | (H, J) |
| Yes | K | Leaf | 3 | G | I | K | K | (J, K) |
| Yes | L | Leaf | 3 | G | I | L | L | (K, L) |
| Yes | M | Leaf | 2 | G | M | M | M | (I, M) (L, M) |
| Yes | N | Leaf | 1 | N | N | N | N | (G, N) (M, N) |

As illustrated in TABLE II, fifteen similarity values are used to determine the value associated with the initial depth-first search sequence. The fifteen similarity values consist of a similarity value between stocks C and D, a similarity value between stocks C and E, a similarity value between stocks B and F, a similarity value between stocks D and F, a similarity value between stocks E and F, a similarity value between stocks A and G, a similarity value between stocks F and H, a similarity value between stocks H and I, a similarity value between stocks H and J, a similarity value between stocks J and K, a similarity value between stocks K and L, a similarity value between stocks I and M, a similarity value between stocks L and M, a similarity value between stocks G and N, and a similarity value between stocks M and N. In this example, the function used to determine the value associated with the initial depth-first search sequence is a sum of the fifteen similarity values.

TABLE III shows a modified sequence for considering child stocks of the base stock in a depth-first search of the tree. The modified sequence is used to provide a second depth-first search for considering stocks in the tree.

TABLE III

| Stock | Sequence for considering child stocks |
|---|---|
| S | G A N |
| A | B F |
| B | C D |
| C | — |
| D | E |
| E | — |
| F | — |
| G | H I M |
| H | — |
| I | J K L |
| J | — |
| K | — |
| L | — |
| M | — |
| N | — |

TABLE IV illustrates one embodiment of determining a value associated with the second depth-first search sequence. As illustrated, sixteen similarity values are used to determine the value associated with the second depth-first search sequence. The sixteen similarity values consist of a similarity value between stocks H and I, a similarity value between stocks H and J, a similarity value between stocks J and K, a similarity value between stocks K and L, a similarity value between stocks I and M, a similarity value between stocks L and M, a similarity value between stocks A and G, a similarity value between stocks B and M, a similarity value between stocks C and M, a similarity value between stocks C and D, a similarity value between stocks C and E, a similarity value between stocks B and F, a similarity value between stocks D and F, a similarity value between stocks E and F, a similarity value between stocks A and N, and a similarity value between stocks F and N. In this example, the function used to determine the value associated with the second depth-first search sequence is a sum of the sixteen similarity values.

TABLE IV

| At least one stock previously considered? | Stock | Internal or leaf? | Level | 1 | 2 | 3 | 4 | Similarity values used in function evaluation |
|---|---|---|---|---|---|---|---|---|
| No  | G | Internal | 1 | G | — | — | — | — |
| No  | H | Leaf     | 2 | G | H | H | H | — |
| Yes | I | Internal | 2 | G | I | H | H | (H, I) |
| Yes | J | Leaf     | 3 | G | I | J | J | (H, J) |
| Yes | K | Leaf     | 3 | G | I | K | K | (J, K) |
| Yes | L | Leaf     | 3 | G | I | L | L | (K, L) |
| Yes | M | Leaf     | 2 | G | M | M | M | (I, M) (L, M) |
| Yes | A | Internal | 1 | A | M | M | M | (A, G) |
| Yes | B | Internal | 2 | A | B | M | M | (B, M) |
| Yes | C | Leaf     | 3 | A | B | C | C | (C, M) |
| Yes | D | Internal | 3 | A | B | D | C | (C, D) |
| Yes | E | Leaf     | 4 | A | B | D | E | (C, E) |
| Yes | F | Leaf     | 2 | A | F | F | F | (B, F) (D, F) (E, F) |
| Yes | N | Leaf     | 1 | N | N | N | N | (A, N) (F, N) |

The above process is repeated for additional depth-first search sequences by modifying a sequence for considering child stocks for at least one stock. Potential sequences for considering child stocks of stock S are A-G-N, A-N-G, G-A-N, G-N-A, N-A-G and N-G-A. Potential sequences for considering child stocks of stock A are B-F and F-B. Potential sequences for considering child stocks of stock B are C-D and D-C. Stock D has one potential sequence for considering its child, namely stock E. Potential sequences for considering child stocks of stock G are H-I-M, H-M-I, I-H-M, I-M-H, M-H-I and M-I-H. Potential sequences for considering child stocks of stock I are J-K-L, J-L-K, K-J-L, K-L-J, L-J-K and L-K-J.

Values associated with all possible depth-first search sequences of the tree may be determined. The number of possible depth-first search sequences of the tree is equal to the product of 3!, 2!, 2!, 1!, 3! and 3!, which equals 864.

Preferably, values associated with at most half of all possible depth-first search sequences of the tree (432 in this example) are determined. In this case, the depth-first search sequences which are considered are limited by prohibiting reverse-equivalent sequences for considering child stocks of the root stock, namely the stock S. In this example, the sequences for considering child stocks of the stock S may be limited to A-G-N, A-N-G and G-A-N (whose reverse-equivalent sequences are N-G-A, G-N-A and N-A-G, respectively).

Based on the values, the depth-first search sequence having a maximum value associated therewith is determined. For purposes of illustration and example, consider that the value associated with the second depth-first search sequence is greater than or equal to values associated with the other depth-first search sequences. A signal may be outputted to display a planar depiction of the tree in which the stocks are ordered according to the second depth-first search sequence.

A browsing sequence may be provided in accordance with the second depth-first search sequence. In this case, the sequence for browsing the stocks is G-H-I-J-K-L-M-A-B-C-D-E-F-N (see the second column of TABLE IV). The browsing sequence and the tree may be used in accordance with the teachings in the patent application having Ser. No. 09/533,545, now U.S. Pat. No. 6,460,033, which is hereby incorporated by reference into the present disclosure.

In the above example, cyclic-equivalent and reverse cyclic-equivalent sequences may be prohibited by prohibiting cyclic-equivalent and reverse cyclic-equivalent sequences for considering child stocks of the root stock, namely the stock S. Thus, the sequence for considering child stocks of the stock S may be limited to A-G-N, since G-N-A and N-A-G are cyclic-equivalent sequences, and N-G-A, A-N-G and G-A-N are reverse cyclic-equivalent sequences. In this case, the stocks from the first non-root stock to the first leaf stock may be considered twice to determine a value associated with a depth-first search sequence of the tree. In the above example, the value associated with initial depth-first search sequence would be further based upon a similarity value between stocks A and N, a similarity value between stocks B and N, and a similarity value between stocks C and N. The value associated with the second depth-first search sequence would be further based upon a similarity value between stocks G and N, and a similarity value between stocks H and N. However, as explained above, the second depth-first search sequence would not have been considered.

An apparatus for performing embodiments of the herein-disclosed methods and examples may comprise one or more programmed computers. Each programmed computer may provide a particular functionality implemented using hardware and/or software and/or firmware.

Preferably, a programmed computer includes a computer memory encoded with executable instructions representing a computer program. A processor is responsive to the computer memory to perform a series of specifically identified operations dictated by the computer program. In this way, the computer program can cause the computer to act in a particular fashion.

Examples of the processor include, but are not limited to, a general purpose microprocessor, an application-specific integrated circuit (which may be either standard or custom), one or more discrete logic elements, a digital signal processor, an analog signal processor, one or more circuits, or any combination thereof. It is noted that the processor may be embodied by either a single processing unit or a plurality of processing units. For example, the processor may be embodied by either a single, central processing unit or a plurality of distributed processing units.

Examples of the computer memory include, but are not limited to, an electronic memory, a magnetic memory, an optical memory, and a magneto-optical memory. Examples of an electronic memory include, but are not limited to, a programmable electronic memory and a read-only, hard-wired electronic memory. Examples of a magnetic memory include, but are not limited to, a magnetic disk and a magnetic tape. The magnetic disk may be embodied by a magnetic floppy diskette or a magnetic hard drive, for example. Examples of an optical memory include, but are not limited to, an optical disk. The optical disk may be embodied by a compact disk or a DVD, for example. Regardless of its form, the computer memory may be either read-only, once-writable, or rewritable.

In general, the processor may be responsive to any data structures, computer programs, and signals encoded on a computer-readable medium to perform an embodiment of any of the herein-disclosed methods and examples. Examples of the computer-readable medium include, but are not limited to, computer-readable storage media and computer-readable communication media. Examples of computer-readable storage media are described with reference to the computer memory.

The computer is coupled to a display to display the visible representations described herein and other visible information to an end user. Examples of the display include any of the herein-disclosed display devices.

The computer receives user input indicating a selection of a region from one or more input devices. Examples of the one or more input devices include, but are not limited to, a keyboard, a touch screen, a touch pad, a voice input device, and a pointing device (e.g. a mouse or a pointing stick). The computer processes the user input and/or communicates at least one signal based upon the user input. The display and the one or more input devices facilitate user interaction with the computer.

Embodiments of the herein-disclosed methods and examples can be performed using either a single computer or a plurality of computers. A plurality of computers may cooperate in a client-server fashion, for example, wherein a server computer outputs at least one signal to cause a client computer to display a visible representation and/or to provide a user interface. The plurality of computers may cooperate in a peer-to-peer fashion, for example, wherein one peer computer acts as a server computer and another peer computer acts as a client computer.

The teachings herein can be combined with and/or applied to any of the teachings in U.S. application Ser. No. 09/243,595, now U.S. Pat. No. 6,359,635, which is hereby incorporated by reference in this application.

As stated in the foregoing description, similarity values may be based on a correlation between trading behaviors of two financial items. Other examples of trading behaviors include, but are not limited to, postings of buy or sell messages such as those monitored by ThomsonFN.com's I-Watch™ service. The messages may include super messages in which brokers/dealers specify whether they want to buy or sell a particular stock, a size of the particular stock to trade, and an exact price. The messages may include interest messages which are not binding. The similarity values may be equal to or otherwise based on a correlation coefficient between the postings of messages for two financial items. To determine the correlation coefficient, a time series indicating an aggregate level of messaging for each of a plurality of time intervals is determined for each stock. For example, the time series for a stock may indicate the aggregate level of messaging within 5 minute or 20 minute intervals, such as the data provided by ThomsonFN.com's I-Watch™ service. The correlation coefficient is a cross correlation between two time series for two different stocks.

Embodiments of the present invention have many practical applications. A financial Web site can display regions to show how a selected financial item relates to other financial items. Each region may be user-selectable so that a user can retrieve information associated with its corresponding financial item. Examples of the information include, but are not limited to, a quote, a bid price, an offer price, trading volume, a chart, technical analysis, fundamental analysis, historical prices, profile information, research for the item, an income statement, a balance sheet, a prospectus, and a message board associated with the item. Further, a selection of a region may facilitate (e.g. either assist or initiate) a transaction involving the financial item (e.g. buying or selling a stock).

The financial items represented by the regions may comprise either all financial items in an index (e.g. all stocks in the Standard & Poors' 500 index), all financial items in a user's watch list, only the nearest neighbors to the base financial item based on the similarity values, all financial items in a market sector, or all financial items in a market industry, for example. Preferably, only financial items whose correlation with the base financial item is greater than zero are considered for inclusion in the graphical representation. Optionally, a criterion for including financial items in the graphical representation may be more stringent, for example, only financial items whose correlation with the base financial item is greater than a positive threshold (e.g. 0.2, 0.5, 0.7) are considered for inclusion in the graphical representation.

A mutual fund family may determine how a family of its mutual funds are interrelated based on similarity values. The relationship can be displayed on the mutual fund family's Web site, displayed in an on-line version of a prospectus or an annual report, and/or printed in a hard copy prospectus or an annual report.

The regions may be displayed with different display properties based on a property of the items. Examples of the property include, but are not limited to, a sector within which the item is contained, an industry within which the item is contained, a change in price of the item, a change in volume of the item, a percentage of institutional volume, a percentage of retail volume, and an amount of institutional interest to buy or sell based on super messages and/or interest messages. Examples of the display property include, but are not limited to, an interior color of the region, an interior gray scale of the region, an interior fill pattern for the region, a color bordering the region, an image within the region, and text within the region. For example, the color may be a shade of green if the price is up, and a shade of red if the price is down.

A sequence of the same graphical representation but with time-varying display properties can be displayed in succession to provide an animated view of the financial information over the course of a time period. For example, a recap of the price action of each financial item over the course of a day can be shown in an animation that lasts much less time (e.g. under 30 seconds, or under a minute). In this case, the colors of the regions may change during the animation to reflect price changes in the respective items over the course of the day.

By selecting the base item to be a newsworthy stock or another newsworthy financial item, a financial news service can show how buying or selling pressure in the newsworthy item is spreading to other stocks or financial items. The financial news service may be either a television broadcast service, a computer network service such as an Internet service, a wireless telephone or PDA service, or a print service.

By allowing a user to select the base item, the user can be provided a view of the stock market that focuses on his/her own stock of interest. For example, a user may select the base item to be a stock that the user either owns, shorts, is interested in buying, or is interested in selling.

Optionally, the weight value of each item can be based on the similarity value between the item and the base item. In this case, items which are highly-similar to the base item are displayed with greater areas than items which are less similar to the base item. Each weight value can be based on or equal to the correlation between the corresponding item and the base item. For example, the weight value may be equal to the correlation if the correlation is greater than zero. As another example, the weight value may be equal to the correlation squared if the correlation is greater than zero. In both of the above examples, an item would not be considered for and included in the graphical representation if its correlation with the base item is less than or equal to zero.

Figure 11:
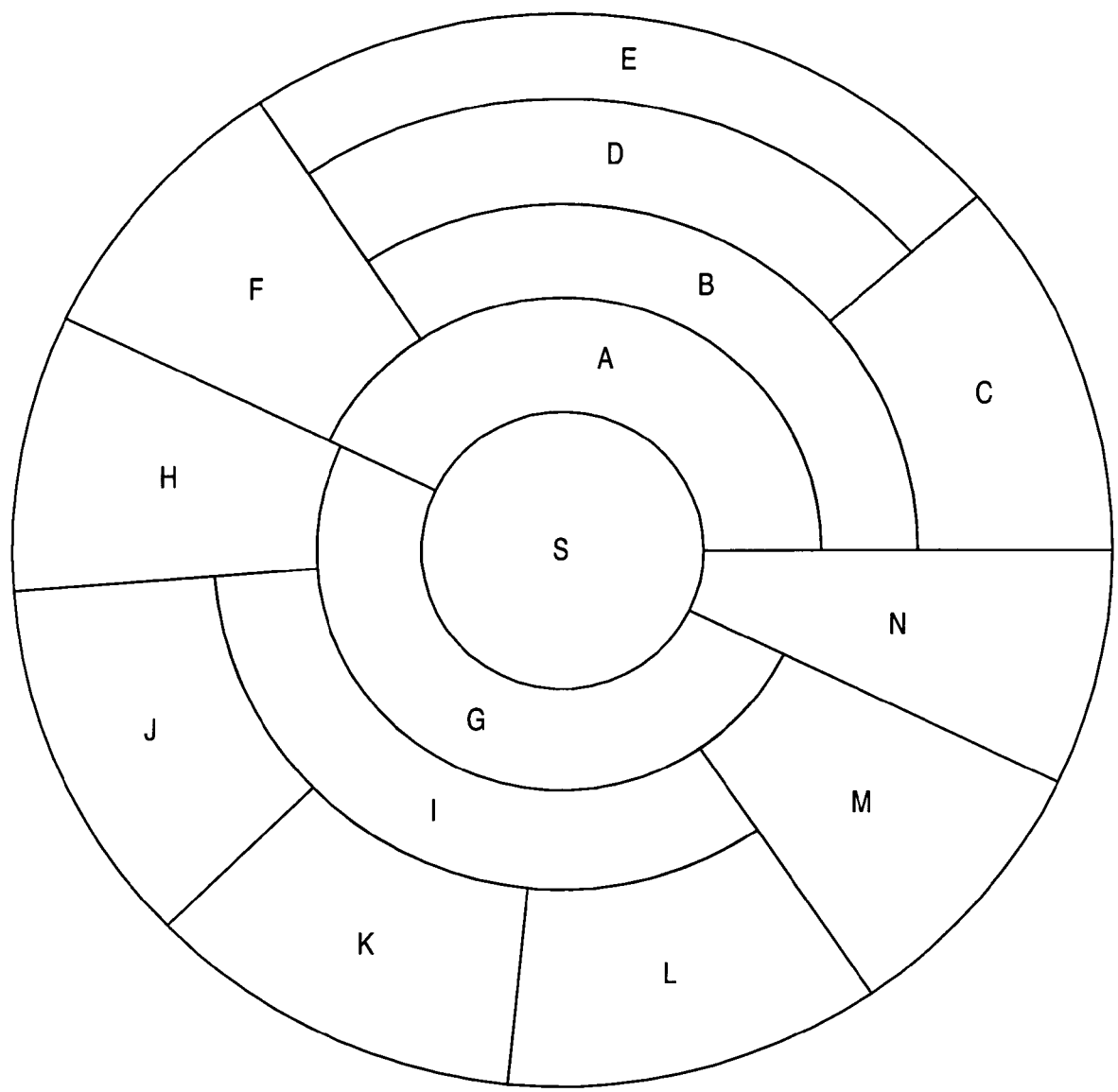
FIG. 11 is a first example of regions to represent the fourteen stocks A-N and the base stock S related by the tree in FIG. 10.

FIG. 11 is a first example of regions to represent the fourteen stocks A-N and the base stock S related by the tree in FIG. 10. In this example, the regions all have approximately the same area. The regions provide a 360-degree view of the stocks A-N and S.

Figure 12:
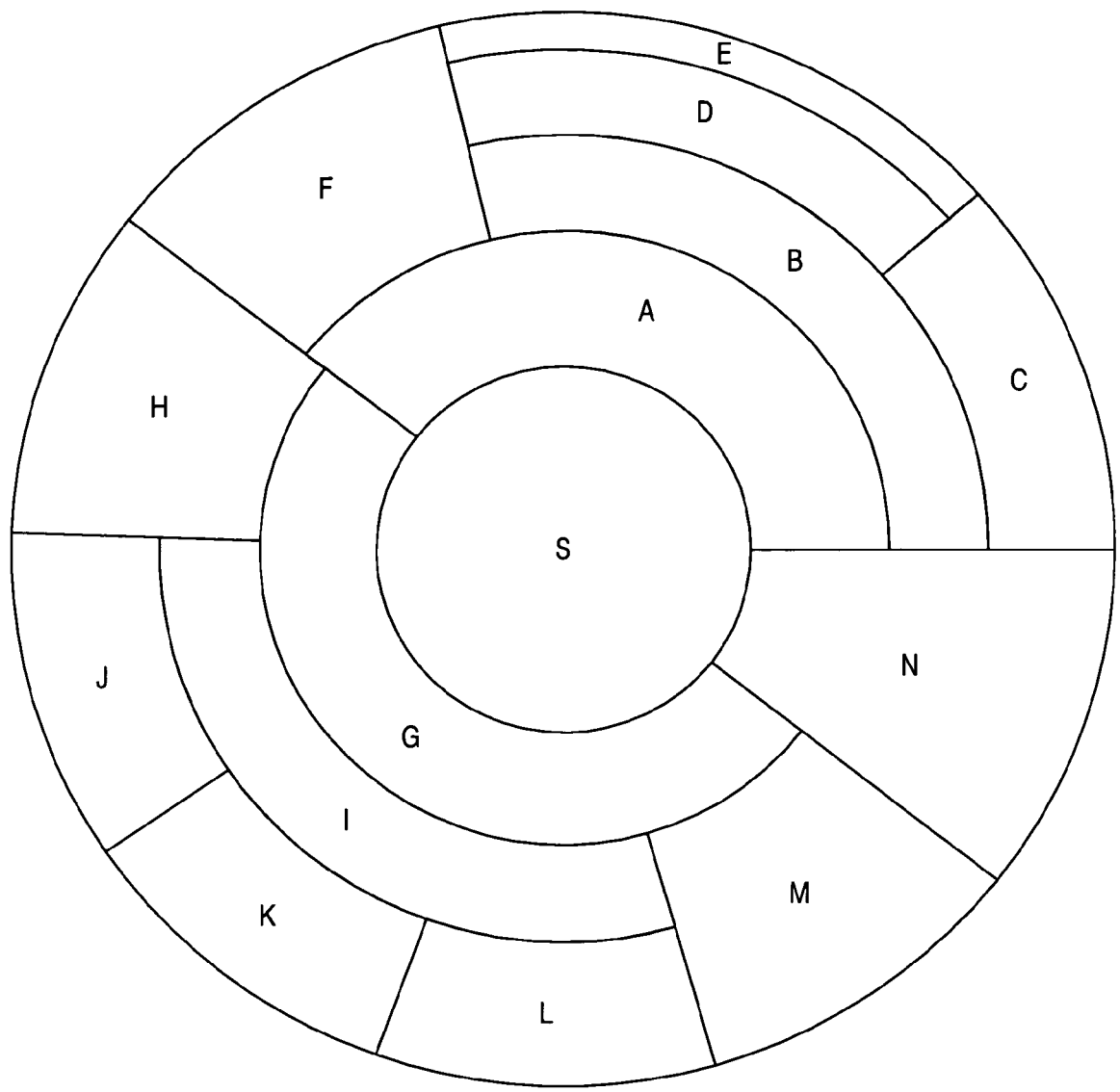
FIG. 12 is a second example of regions to represent the fourteen stocks A-N and the base stock S related by the tree in FIG. 10.

FIG. 12 is a second example of regions to represent the fourteen stocks A-N and the base stock S related by the tree in FIG. 10. In this example, each region has an area based on a similarity value between its corresponding stock and the base stock. Thus, if a first stock (e.g. stock A) is more similar to the base stock S than a second stock (e.g. stock B) is to the base stock S, the region representing stock A has a greater area than the region representing stock B. The regions provide a 360-degree view of the stocks A-N and S.

It will be apparent to those skilled in the art that the disclosed inventions may be modified in numerous ways and may assume many embodiments other than the preferred forms specifically set out and described herein. For example, the acts described with reference to FIGS. 1-4 and 6-8 may be executed in an order other than that indicated in FIGS. 1-4 and 6-8. Further, some of the acts may be performed in parallel. Still further, the regions may have the herein-disclosed similarity-based areas but with non-annulus-sector shapes in alternative embodiments.

Accordingly, it is intended by the appended claims to cover all modifications which fall within the true spirit and scope of the present invention.

What is claimed is:

1. An apparatus comprising:
a display device; and
at least one computer programmed to cause the display device to display a visible representation of a plurality of stock market indices that is based on a selected stock market index, the plurality of stock market indices comprising the selected stock market index and a plurality of other stock market indices related to the selected stock market index by a non-unary tree, the visible representation comprising a region to represent the selected stock market index, the visible representation further comprising a plurality of regions to represent the plurality of other stock market indices, the plurality of regions approximately shaped as a plurality of annulus sectors each having a respective area based on a respective market capitalization associated with its represented one of the plurality of other stock market indices, wherein the visible representation represents pairs of stock market indices that are adjacent in the non-unary tree by radially-adjacent pairs of their representing regions.

2. The apparatus of claim 1 wherein the plurality of other stock market indices comprise a parent stock market index and a plurality of child stock market indices, the plurality of child stock market indices being children of the parent stock market index in the non-unary tree, wherein the at least one computer is programmed to modify a clockwise order of the plurality of child stock market indices in the visible representation.

3. The apparatus of claim 1 wherein the visible representation has a first plurality of angularly-adjacent pairs of the plurality of regions, and wherein the at least one computer is programmed to rearrange at least two of the plurality of regions so that the visible representation has a second plurality of angularly-adjacent pairs of the plurality of regions, wherein the second plurality of angularly-adjacent pairs differs from the first plurality of angularly-adjacent pairs.

4. The apparatus of claim 1 wherein the plurality of regions approximately shaped as the plurality of annulus sectors are angularly arranged based on a plurality of correlation values between a corresponding plurality of pairs of the other stock market indices.

5. The apparatus of claim 1 wherein the region to represent the selected stock market index is approximately shaped as a circle.

6. The apparatus of claim 1 wherein each of the plurality of regions approximately shaped as the plurality of annulus sectors has a respective color based on a respective change in price of its represented one of the plurality of other stock market indices.

7. The apparatus of claim 1 wherein the non-unary tree has a height of at least two.

8. The apparatus of claim 1 wherein the at least one computer comprises a server computer and a client computer, wherein the server computer outputs at least one signal to cause the client computer to display the visible representation using the display device.

9. The apparatus of claim 1 further comprising a touch screen, wherein the at least one computer is programmed to receive a user input from the touch screen, the user input indicating a selection of one of the plurality of regions approximately shaped as the plurality of annulus sectors.

10. The apparatus of claim 1 further comprising a keyboard to facilitate user interaction with the at least one computer.

11. A non-transitory computer-readable storage medium encoded with a computer program, the computer program to cause at least one computer to:
display, using a display device coupled to the at least one computer, a visible representation of a plurality of stock market indices that is based on a selected stock market index, the plurality of stock market indices comprising the selected stock market index and a plurality of other stock market indices related to the selected stock market index by a non-unary tree, the visible representation comprising a region to represent the selected stock market index, the visible representation further comprising a plurality of regions to represent the plurality of other stock market indices, the plurality of regions approximately shaped as a plurality of annulus sectors each having a respective area based on a respective market capitalization associated with its represented one of the plurality of other stock market indices, wherein the visible representation represents pairs of stock market indices that are adjacent in the non-unary tree by radially-adjacent pairs of their representing regions.

12. The non-transitory computer-readable storage medium of claim 11 wherein the plurality of other stock market indices comprise a parent stock market index and a plurality of child stock market indices, the plurality of child stock market indices being children of the parent stock market index in the non-unary tree, wherein the computer program further is to cause the at least one computer to:
modify a clockwise order of the plurality of child stock market indices in the visible representation.

13. The non-transitory computer-readable storage medium of claim 11 wherein the visible representation has a first plurality of angularly-adjacent pairs of the plurality of regions, and wherein the computer program further is to cause the at least one computer to:
rearrange at least two of the plurality of regions so that the visible representation has a second plurality of angularly-adjacent pairs of the plurality of regions, wherein the second plurality of angularly-adjacent pairs differs from the first plurality of angularly-adjacent pairs.

14. The non-transitory computer-readable storage medium of claim 11 wherein the plurality of regions approximately shaped as the plurality of annulus sectors are angularly arranged based on a plurality of correlation values between a corresponding plurality of pairs of the other stock market indices.

15. The non-transitory computer-readable storage medium of claim 11 wherein the region to represent the selected stock market index is approximately shaped as a circle.

16. The non-transitory computer-readable storage medium of claim 11 wherein each of the plurality of regions approximately shaped as the plurality of annulus sectors has a respective color based on a respective change in price of its represented one of the plurality of other stock market indices.

17. The non-transitory computer-readable storage medium of claim 11 wherein the non-unary tree has a height of at least two.

18. The non-transitory computer-readable storage medium of claim 11 wherein the at least one computer comprises a server computer and a client computer, wherein the server computer outputs at least one signal to cause the client computer to display the visible representation using the display device.

19. The non-transitory computer-readable storage medium of claim 11 wherein the computer program further causes the at least one computer to receive a user input from a touch screen, the user input indicating a selection of one of the plurality of regions approximately shaped as the plurality of annulus sectors.

20. A method comprising:
displaying, using a display device coupled to at least one computer, a visible representation of a plurality of stock market indices that is based on a selected stock market index, the plurality of stock market indices comprising the selected stock market index and a plurality of other stock market indices related to the selected stock market index by a non-unary tree, the visible representation comprising a region to represent the selected stock market index, the visible representation further comprising a plurality of regions to represent the plurality of other stock market indices, the plurality of regions approximately shaped as a plurality of annulus sectors each having a respective area based on a respective market capitalization associated with its represented one of the plurality of other stock market indices, wherein the visible representation represents pairs of stock market indices that are adjacent in the non-unary tree by radially-adjacent pairs of their representing regions.

21. The method of claim 20 wherein the plurality of other stock market indices comprise a parent stock market index and a plurality of child stock market indices, the plurality of child stock market indices being children of the parent stock market index in the non-unary tree, the method further comprising:
modifying a clockwise order of the plurality of child stock market indices in the visible representation.

22. The method of claim 20 wherein the visible representation has a first plurality of angularly-adjacent pairs of the plurality of regions, the method further comprising:
rearranging at least two of the plurality of regions so that the visible representation has a second plurality of angularly-adjacent pairs of the plurality of regions, wherein the second plurality of angularly-adjacent pairs differs from the first plurality of angularly-adjacent pairs.

23. The method of claim 20 wherein the plurality of regions approximately shaped as the plurality of annulus sectors are angularly arranged based on a plurality of correlation values between a corresponding plurality of pairs of the other stock market indices.

24. The method of claim 20 wherein the region to represent the selected stock market index is approximately shaped as a circle.

25. The method of claim 20 wherein each of the plurality of regions approximately shaped as the plurality of annulus sectors has a respective color based on a respective change in price of its represented one of the plurality of other stock market indices.

26. The method of claim 20 wherein the non-unary tree has a height of at least two.

27. The method of claim 20 wherein the at least one computer comprises a server computer and a client computer, wherein the server computer outputs at least one signal to cause the client computer to display the visible representation using the display device.

28. The method of claim 20 further comprising:
using the at least one computer to initiate a transaction that involves buying or selling a stock.

29. The method of claim 20 further comprising:
using the at least one computer to assist a transaction that involves buying or selling a stock.

* * * * *